United States Patent
Xiao et al.

(10) Patent No.: US 12,436,139 B1
(45) Date of Patent: Oct. 7, 2025

(54) GRADING EVALUATION METHOD AND SYSTEM FOR HIGH-MATURITY GAS SOURCE ROCK BASED ON HYDROCARBON GENERATION AND EXPULSION SIMULATION

(71) Applicant: China University of Petroleum (East China), Qingdao (CN)

(72) Inventors: Dianshi Xiao, Qingdao (CN); Xiaodie Guan, Qingdao (CN); Min Wang, Qingdao (CN); Shu Jiang, Qingdao (CN); Zhuo Li, Qingdao (CN); Yingjie Liu, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/969,341

(22) Filed: Dec. 5, 2024

(30) Foreign Application Priority Data

Apr. 9, 2024 (CN) .......................... 202410417412.9

(51) Int. Cl.
*G01N 33/24* (2006.01)
*G01N 15/08* (2006.01)

(52) U.S. Cl.
CPC ......... *G01N 33/241* (2013.01); *G01N 15/088* (2013.01)

(58) Field of Classification Search
CPC .......................... G01N 33/241; G01N 15/088
See application file for complete search history.

(56) References Cited

U.S. PATENT DOCUMENTS 11,352,879 B2 * 6/2022 Li ........................... G06N 20/20
11,499,957 B1 * 11/2022 Wang ...................... G06F 30/28
(Continued)

FOREIGN PATENT DOCUMENTS

CN 112147034 A * 12/2020 ............... G01N 7/16
CN 118225620 A * 6/2024

OTHER PUBLICATIONS

Wang et al. ("Hydrocarbon expulsion model and resource potential evaluation of high-maturity marine source rocks in deep basins: Example from the Ediacaran microbial dolomite in the Sichuan Basin, China") (Year: 2022).*

(Continued)

*Primary Examiner* — Eyob Hagos
(74) *Attorney, Agent, or Firm* — Li & Cai Intellectual Property Office

(57) ABSTRACT

A grading evaluation method for high-maturity gas source rock based on hydrocarbon generation and expulsion simulation includes: establishing a change curve of hydrocarbon generation yield based on a hydrocarbon generation thermal simulation experiment; establishing a change curve of hydrocarbon expulsion of source rocks based on a principle of material balance; determining a classification boundary of source rocks based on the change curve of hydrocarbon generation yield and the change curve of hydrocarbon expulsion of source rocks; and obtaining a spatial distribution of different types of source rocks by combining logging interpretation according to the classification boundary of source rocks. In the method, the evaluation model and change curve of hydrocarbon generation yield, retained gas volume and hydrocarbon expulsion volume of source rock are established, and the classification standard of gas source rock at different maturity stages is determined by combining (Continued)

the change curve of hydrocarbon expulsion efficiency under different maturities.

12 Claims, 13 Drawing Sheets

(56) References Cited

U.S. PATENT DOCUMENTS

| | | | | |
|---|---|---|---|---|
| 2018/0347354 A1* | 12/2018 | Li | ............................ | G06N 20/00 |
| 2020/0018740 A1* | 1/2020 | Hou | ......................... | G06Q 10/04 |
| 2022/0282605 A1* | 9/2022 | Ghassal | ................. | G01N 33/241 |
| 2023/0184737 A1* | 6/2023 | Jacobi | ................... | G01N 23/207 |
| | | | | 702/8 |
| 2023/0417728 A1* | 12/2023 | Srinivasan | ............ | G01N 33/241 |
| 2024/0037903 A1* | 2/2024 | Cesari | ................... | G01N 33/241 |
| 2024/0053319 A1* | 2/2024 | Anifowose | .............. | E21B 49/02 |

OTHER PUBLICATIONS

Wu et al. "The effect of pressure and hydrocarbon expulsion on hydrocarbon generation during pyrolyzing of continental type-III kerogen source rocks" (Year: 2018).*

* cited by examiner

GRADING EVALUATION METHOD AND SYSTEM FOR HIGH-MATURITY GAS SOURCE ROCK BASED ON HYDROCARBON GENERATION AND EXPULSION SIMULATION

CROSS REFERENCE TO THE RELATED APPLICATIONS

This application is based upon and claims priority to Chinese Patent Application No. 202410417412.9, filed on Apr. 9, 2024, the entire contents of which are incorporated herein by reference.

TECHNICAL FIELD

The present invention belongs to the field of unconventional oil and gas source rock classification and evaluation technology, especially relates to a grading evaluation method and system for high-maturity gas source rock based on hydrocarbon generation and expulsion simulation.

BACKGROUND

Source rock evaluation is an important work in exploration. Source rocks are the material basis of oil and gas generation, and also play an important role in oil and gas migration and accumulation and related research of reservoirs. With the development of oil and gas exploration theory, researchers gradually put forward the concepts of ineffective source rocks, effective source rocks and high-quality source rocks, wherein, effective source rocks and high-quality source rocks have more obvious effects on oil and gas generation and accumulation, and their distribution can provide a scientific basis for searching for large oil and gas reservoirs and favorable exploration areas, therefore, it is very necessary to have a grading evaluation for source rocks.

Previously, the classification of source rocks mainly included the following methods:
1. selecting source rock thickness, organic matter abundance, pyrolysis S1 and S2 and other indexes, and classifying source rock types according to the empirical statistical methods. The source rock classification standard determined by this method is highly artificial;
2. by establishing the relationship between organic geochemical parameters, such as the relationship between TOC–$I_h$, TOC-chloroform asphalt A and the relationship between TOC and S1+S2, classifying the source rocks according to the inflection point of the relationship distribution, this method considers the change law of hydrocarbon generation potential or retained hydrocarbon of different types of source rocks, and is mainly suitable for oil type source rocks;
3. by establishing the relationship between hydrocarbon expulsion volume of source rocks and original TOC, classifying the source rocks by combining the intersection diagram of hydrocarbon expulsion efficiency and original TOC. Restoring the original TOC and original hydrocarbon generation potential based on hydrocarbon generation thermal simulation experiment and hydrocarbon generation kinetic model, based on the material balance method, obtaining the hydrocarbon expulsion per unit mass of source rocks (that is, original hydrocarbon generation potential-residual hydrocarbon generation potential), and establishing the change curve between hydrocarbon expulsion and original TOC, and classifying the source rocks according to the variation inflection point of the distribution curve.

The above-existing source rock classification methods have the following disadvantages:
1) the empirical statistics method mainly relies on human experience to classify source rock types, which is not applicable and scientific. In addition, this method cannot be applied to the study area with less geological data.
2) Source rocks are classified according to the inflection point of the curve among TOC and hydrocarbon generation potential, retained hydrocarbon or hydrocarbon expulsion, one is the selection of inflection point has a stronger subjective and is difficult to completely quantify, the selection error is large when the change inflection point is not obvious. In addition, this classification method is mainly suitable for the classification of low-mature-mature oil source rocks currently, while high-maturity gas source rocks have high maturity, generally high maturity (>1.3%), and low retained hydrocarbon volume in source rocks, meanwhile, it is difficult to obtain hydrocarbon generation volume and hydrocarbon expulsion volume in low-maturity stages by hydrocarbon generation thermal simulation experiments. Therefore, this method is not suitable for the classification and evaluation of highly-maturity gas source rocks.

In summary, the existing technical methods have the following problems:
1) the current source rock classification and evaluation methods are mostly suitable for low-mature-mature source rocks, but are difficult to apply to high-maturity gas source rocks, and the curve inflection point is mostly used to distinguish a classification boundary of the source rock, which has poor operability;
2) differences in hydrocarbon expulsion from source rocks in different maturity ranges have not been taken into account, the classification of source rocks will definitely be different at a lower maturity and a higher maturity, and the same source rock classification standard is mostly adopted for the whole study area (with large maturity span), which has low accuracy.

For high-maturity gas source rock samples, the hydrocarbon generation and expulsion results of high-maturity stage are mainly obtained by using hydrocarbon generation thermal simulation experiment, however, the distribution of hydrocarbon generation and expulsion from immature, low-maturity to high-maturity stage of source rock is not supported by actual experimental data, and the distribution of hydrocarbon generation and expulsion in this maturity range needs to be restored; in addition, for different areas, the maturity distribution range of source rocks is wide, and large differences in hydrocarbon expulsion capacity of source rocks under different maturities, so the maturity range should be considered in the classification and evaluation of source rocks; meanwhile, the determination of the boundary of source rock types mostly depends on human observation or empirical statistics, it is necessary to establish operable standards to accurately determine the boundary of different types of source rocks.

SUMMARY

In view of the problems existing in the existing technology, the present invention provides a grading evaluation method for high-maturity gas source rock based on hydrocarbon generation and expulsion simulation.

In view of the problems existing in the grading evaluation of high-maturity gas source rocks, through the hydrocarbon generation thermal simulation experiment, the original TOC and HI index are restored, and the evaluation model of hydrocarbon generation and expulsion efficiency of source rocks in the whole maturity range is established, the boundary between effective source rocks and high-quality source rocks is determined based on the change curve of hydrocarbon generation yield and the change of hydrocarbon expulsion efficiency, and then the classification and evaluation standard of high-maturity gas source rocks is established to determine the distribution of effective source rocks and high-quality source rocks, which can provide technical support for the distribution prediction of large tight gas reservoirs.

The technical scheme of the present invention is:
a grading evaluation method for high-maturity gas source rock based on hydrocarbon generation and expulsion simulation, including:
establishing a change curve of hydrocarbon generation yield based on a hydrocarbon generation thermal simulation experiment;
establishing a change curve of hydrocarbon expulsion of source rocks based on a principle of material balance;
determining a classification boundary of source rocks based on the change curve of hydrocarbon generation yield and the change curve of hydrocarbon expulsion of source rocks;
obtaining a spatial distribution of different types of source rocks by combining logging interpretation according to the classification boundary of source rocks.

Preferably according to the present invention, a source rock sample is preferably selected to carry out the hydrocarbon generation thermal simulation experiment to establish the change curve of hydrocarbon generation yield under different maturities; including:
firstly, sorting out geochemical test data of the source rock of a target layer in a study area, and analyzing geochemical index characteristics of a source rock total organic carbon (TOC), a maturity, an organic matter type, a residual hydrocarbon S1, a cracked hydrocarbon S2, a amount of $CO_2$ produced by organic matter pyrolysis S3, a pyrolysis hydrocarbon peak temperature Tmax, a hydrogen index HI; selecting source rock samples in the target layer, and carrying out the hydrocarbon generation thermal simulation experiment to obtain a hydrocarbon generation volume at different evolution stages (that is, different maturities), obtaining information of the residual TOC, S1, S2 and hydrogen index HI of the experimental samples at different maturities by testing;
restoring the original TOC and original HI of the experimental samples by using a theory of material balance;
based on experimentally obtained hydrogen index HI at different maturities and the restored of the original HI, using an optimized fitting equation to fit the hydrogen index HI at a low-maturity stage, and obtaining a distribution curve of the hydrogen index HI in a whole maturity range;
using an original HIo minus the hydrogen index HI at different maturities, calculating and obtaining a hydrocarbon generation yield of the source rock;
obtaining characteristics of hydrocarbon generation components by combining the hydrocarbon generation simulation experiment, obtaining a relative proportion change of the hydrocarbon generation components at the low-maturity stage by fitting a change trend of the relative proportion of different components, obtaining the change curve of the hydrocarbon generation (oil and gas) yield at the low-maturity stage, and finally obtaining the change curve of the hydrocarbon generation (oil and gas) yield in different maturity stages.

Further preferably, the original TOC and original HI of the experimental samples are restored by using a theory of material balance; including:
an original organic carbon content $TOC_o$ and an original hydrogen index HIo are restored, as shown in Equation (1):

$$TOC_o \times (1-D_o) = TOC_i \times (1-D_i) \quad (1)$$

in Equation (1), $TOC_o$ and $TOC_i$ denote an original organic carbon content of the sample and a current organic carbon content of the sample respectively, %; $D_o$ and $D_i$ denote an original degradation rate and a residual degradation rate respectively, which represent a ratio of effective carbon Cp and organic carbon Ct of the source rock; the original degradation rate $D_o$ is related to an organic matter type of the source rock, according to the Tmax and HI data obtained from an investigation of a study area, the source rock type is identified, and the original degradation rate $D_o$ of the sample is selected; the effective carbon Cp is obtained by using a conversion coefficient of carbon conversion to hydrocarbon volume, and then Di is obtained, as shown in Equation (2):

$$Di = Cp/Ct = ((S1+S2) \times 0.083)/TOCi \quad (2)$$

where S1 is residual hydrocarbon; S2 is cracked hydrocarbon;
a calculation formula of an original hydrocarbon generation potential S2o of the sample is shown in Equation (3):

$$S2o = (TOCo \times Do)/0.083 \quad (3)$$

the restored original hydrogen index HIo is shown in Equation (4) as follows:

$$HIo = S2o/TOCo \quad (4)$$

Preferably according to the present invention, based on experimentally obtained hydrogen index HI at different maturities and the restoration of the original HIo, the optimized fitting equation is used to fit the hydrogen index HI at the low-maturity stage, and the distribution curve of the hydrogen index HI in the whole maturity range is obtained; including:
establishing an evolution curve of hydrogen index, based on the original hydrogen index HIo, and HIi data of source rocks at different maturity stages in hydrocarbon generation thermal simulation experiments, determining the evolution curve of hydrogen index at the low-maturity stage by an optimized fitting method, a fitting equation is shown in Equation (5):

$$HI(R_o) = \frac{HIo}{1 + \exp\left(\theta * \ln\left(\frac{Ro}{\beta}\right)\right)} \quad (5)$$

in Equation (5), HIo is an original hydrogen index, θ and β are dimensionless parameters, which represent a range of hydrocarbon generation and a peak of hydrocarbon generation; using the original HIo minus the hydrogen index HI at different maturities, the hydrocarbon generation yield of the source rock is calculated;

according to the hydrocarbon generation thermal simulation experiment, the hydrocarbon generation yield of the source rock sample after the current maturity is obtained to splice the hydrocarbon generation yield of the source rock to obtain the distribution curve of the hydrocarbon generation yield in a complete maturity range.

Preferably according to the present invention, the change curve of hydrocarbon expulsion of source rocks is established based on the principle of material balance; including:
carrying out an isothermal adsorption experiment of methane in source rock samples, and establishing an evaluation model of methane adsorption gas in source rock by combining TOC, strata pressure and temperature;
establishing an evaluation model of free gas by using a gas state equation through combining collected data of a source rock porosity, water saturation, strata temperature, pressure, gas compression factor, and a rock sample density, and then obtaining an evaluation model of source rock retained gas;
establishing a relationship between the maturity and a burial depth, a strata temperature and pressure according to a burial and thermal history to obtain a maximum retained gas volume distribution curve of source rock under different maturities; according to the method for generation-retained-expulsion, and according to a relationship between hydrocarbon generation volume curve and the maximum retained gas curve under different maturities, calculating a change curve of hydrocarbon expulsion volume under different maturities.

Further preferably, the Langmuir equation is used to establish the evaluation model of adsorption gas, including: the establishment of the evaluation model of methane adsorption gas in source rock, including:
selecting several source rock samples with different abundances to carry out the methane isothermal adsorption experiment to obtain a Langmuir volume $V_L$ and Langmuir pressure $P_L$, analyzing a relationship between $V_L$ and $P_L$ with TOC, temperature and clay minerals, and establishing calculation models of $V_L$ and $P_L$ by preferred indexes; according to the current TOC and strata pressure, temperature, clay mineral parameters, obtaining an adsorption gas volume $V_{adsorption}$ of the source rock by using the Langmuir equation; as shown in Equation (6):

$$V_{adsorption}=(V_L P)/(P+P_L)=h_1(P,T,\text{TOC,clay}) \quad (6)$$

in Equation (6), T is a strata temperature, K; $V_L$ is a Langmuir volume, which represents a maximum methane adsorption capacity, cm³/g; $P_L$ is a Langmuir pressure, Mpa; P is a strata pressure, Mpa; $V_{adsorption}$ is an adsorption gas volume, cm³/g; clay is a clay content, %.

The established evaluation model of methane adsorption gas in source rock, that is, the calculation model of $V_L$ and $P_L$, is shown in Equation (6) above.

Further preferably, the establishment of the evaluation model of free gas by using the gas state equation, including:
obtaining a content of free gas by using an ideal gas state equation; as shown in Equation (7):

$$V_{free} = h_2(P, T, \varphi, Sw, Z) = \frac{P\varphi(1-Sw)ZoTo}{PoZT\rho} \quad (7)$$

in Equation (7), φ is a porosity of source rock, decimal, derived by collecting porosity test values of source rock under different maturities, and establishing a relationship between porosity and maturity evolution by fitting; P is strata pressure, MPa; Po is pressure under a standard condition, MPa; T is a strata temperature, K; To is a surface temperature, K; Sw is a water saturation, decimal, derived by collecting measured water saturation data of source rock samples, and establishing a relationship between water saturation and maturity and clay content; Z and Zo are methane compression factors under strata conditions and standard atmospheric pressure, obtained by industry standard query; p is a density of rock sample, g/cm³;

the established evaluation model of free gas is shown in Equation (7) above.

Further preferably, under the same maturity, the adsorbed gas volume plus the free gas volume to obtain the retained gas volume, that is, $V_{retained}=V_{adsorption}+V_{free}$, so as to calculate and obtain the evaluation model of retained gas in source rock under different maturities.

Further preferably, the change curve of hydrocarbon expulsion volume is calculated under different maturities; including:
combining with the change curve of hydrocarbon generation yield, establishing the relationship between the maturity and the burial depth, strata temperature and pressure according to the burial and thermal history to obtain the maximum retained gas volume distribution curve of source rock under different maturities; using the method for generation minus retained equal to expulsion, according to the relationship between the gas generation curve and the maximum retained gas curve under different maturities, calculating the change curve of hydrocarbon expulsion volume under different maturities; as shown in Equation (8):

$$V_{hydrocarbon\ expulsion}=V_{gas\ generation}-V_{retained}=\\V_{gas\ generation}-(V_{adsorption}+V_{free}) \quad (8)$$

in Equation (8), $V_{gas\ generation}$ is a gas generation volume at a certain maturity; $V_{hydrocarbon\ expulsion}$ is a hydrocarbon expulsion volume under a certain maturity of the source rock; a retained gas volume is a sum of free gas and adsorbed gas, the maturity, strata temperature and strata pressure under different burial depths are obtained according to the evaluation model of adsorbed gas and the evaluation model of free gas, and combined with the burial and thermal history of the study area, a relationship between burial depth and temperature, maturity and strata pressure is established by the equation fitting to obtain the distribution curve of maximum retained gas volume in source rock under different maturities; using the method for generation-retained expulsion, according to the relationship between the gas generation curve and the maximum retained gas curve under different maturities, realizing an evaluation of hydrocarbon expulsion of source rocks under different maturities;
obtaining the hydrocarbon generation yield $A_{hydrocarbon\ generation\ i}$ under a certain maturity Roi by using the obtained hydrocarbon generation yield curve, combining with the original TOCo of the source rock, calculating the gas generation volume $V_{gas\ generation\ i}$ of the source rock under a certain maturity, obtaining the gas generation curve by calculating the gas generation volume under different maturities; as shown in Equation (9):

$$V_{gas\ generation} = A_{hydrocarbon\ generation} \times \frac{TOCo}{100} / \rho_{methane} \quad (9)$$

where, $\rho_{methane}$ is a methane density under a standard condition, 0.000717 g/cm³;

calculating the change curve of hydrocarbon expulsion of source rock according to the change of gas generation volume and gas retained volume in source rock under different maturities; it means that when the gas generation volume is less than or equal to the maximum retained gas volume at a certain maturity, there is no methane gas discharged from the source rock, and the hydrocarbon expulsion volume is 0; when the volume of gas generated is greater than the maximum retained gas volume of the source rock, gas expulsion begins, and the hydrocarbon expulsion volume is greater than 0.

Further preferably, the classification boundary of source rocks is determined based on the change curve of hydrocarbon generation yield and the change curve of hydrocarbon expulsion of source rocks; including:

analyzing a distribution range of source rock maturity and TOC in the study area, and preferably selecting a series of maturity values (M maturity value(s)) and corresponding TOC values (N TOC value(s)) according to a certain step size, for any TOCi, restoring an original TOC according to Equation (1), establishing the change curves of gas generation and hydrocarbon expulsion volume respectively according to Equation (9) and Equation (8), extracting the $V_{gas\ generation\ ij}$ (when corresponding to TOCj and Roi) and $V_{hydrocarbon\ expulsion\ ij}$ (when corresponding to TOCj and Roi) corresponding to Roj, and calculating the hydrocarbon expulsion efficiency $K_{ij} = V_{hydrocarbon\ expulsion\ ij}/V_{gas\ generation\ ij}$, establishing a change curve of hydrocarbon expulsion efficiency with TOCi under a certain maturity Roj, that is, a hydrocarbon expulsion efficiency curve;

when the hydrocarbon expulsion efficiency curve begins to be greater than 0, the corresponding TOCi value is a lower limit of the effective source rock at this maturity; when the change rate of hydrocarbon expulsion efficiency at two adjacent points begins to be less than 10%, the corresponding TOC value is the lower limit of the high-quality source rock at this maturity; it is considered that under this maturity, the effective source rock is evaluated when the original TOC value is greater than the lower limit of the effective source rock, and less than the lower limit of the high-quality source rock; the high-quality source rock is evaluated when the original TOC value is greater than the lower limit of the high-quality source rock; obtaining the change curve of hydrocarbon expulsion efficiency with TOCi under different maturities by changing Roj; obtaining a classification boundary of effective source rock and high-quality source rock under different maturities according to a source rock boundary division method in the above steps.

The spatial distribution of different types of source rocks is obtained by combining logging interpretation according to the classification boundary of source rocks; including:

based on an improved ΔlgR technology, combining with acoustic and resistivity curves, carrying out a regression analysis according to the formula TOC=a*lgRT+ b*AC+C, so as to obtain a, b, c in a TOC interpretation model, and establishing a prediction model of source rock organic matter abundance;

obtaining the maturity under different burial depths by combining the burial and thermal history of the study area, and obtaining a relationship between maturity and burial depth by fitting the maturity and burial depth;

obtaining an organic carbon content under different burial depths by using the source rock organic matter abundance model established by acoustic and resistivity curve; obtaining a maturity under different burial depths according to a relationship between maturity and burial depth; identifying a vertical distribution of effective source rocks and high-quality source rocks in multiple wells by combining a classification boundary of source rocks under different maturities; and realizing a spatial distribution characterization of different types of source rock thickness in the study area by counting thickness of different types of source rocks in multiple wells and combining well coordinates.

Preferably according to the present invention, if the sample is at the high-maturity stage, that is, Ro>1.5%, combined with the hydrocarbon generation thermal simulation experiment, the yield of oil and gas at different maturities is obtained; a proportion distribution method is used to divide the hydrocarbon generation (oil and gas) products at the low-mature-mature stage (Ro<1.5), a proportion of products at the low-mature-mature stage is divided by extending the trend line according to an evolution trend of the proportion of simulation experiment products; finally, a complete hydrocarbon generation (oil, gas) yield change curve is obtained.

A computer device, the computer device includes memory and a processor, the memory stores a computer program, and the processor executes the computer program to implement steps of the grading evaluation method for high-maturity gas source rock based on hydrocarbon generation and expulsion simulation.

A computer-readable storage medium, a computer program is stored on the computer-readable storage medium, and steps of the grading evaluation method for high-maturity gas source rock based on hydrocarbon generation and expulsion simulation are implemented when the computer program is executed by the processor.

A grading evaluation system for high-maturity gas source rock based on hydrocarbon generation and expulsion simulation, including:

an establishment module of a change curve of hydrocarbon generation yield is configured as: establishing a change curve of hydrocarbon generation yield based on a hydrocarbon generation thermal simulation experiment;

an establishment module of a change curve of hydrocarbon expulsion of source rocks is configured as: establishing a change curve of hydrocarbon expulsion of source rocks based on a principle of material balance;

a determination module of classification boundary of the source rock is configured as: determining a classification boundary of source rocks based on the change curve of hydrocarbon generation yield and the change curve of hydrocarbon expulsion of source rocks;

a determination module of a spatial distribution type of source rock is configured as: obtaining a spatial distribution of different types of source rocks by combining logging interpretation according to the classification boundary of source rocks.

In summary, the advantages and positive effects of the present invention are:

with the gradual transformation of oil and gas exploration to deep layers, it is particularly important to establish a classification standard for high-maturity gas source rocks. Most of the previous source rock classification methods are suitable for the source rocks at the low-mature-mature stage, and have poor applicability to the classification of high-maturity gas source rocks, and the classification boundary is highly artificial and the accuracy is low. The present invention provides a grading evaluation method and system for high-maturity gas source rock based on hydrocarbon generation and expulsion simulation, through hydrocarbon generation thermal simulation and methane isothermal adsorption experiment, combined with burial and thermal history, the evaluation model and change curve of hydrocarbon generation yield, retained gas volume and hydrocarbon expulsion volume of source rocks are established; combined with the change curve of hydrocarbon expulsion efficiency under different maturities, the classification standard of gas source rocks in different maturity stages are determined, and the spatial distribution characterization of different types of gas source rocks is realized by combining the logging data. This method can classify and evaluate high-maturity gas source rocks, and establish a classification standard for gas source rocks in different maturity intervals.

DETAILED DESCRIPTION OF THE EMBODIMENTS

In order to make the objective, technical solution and advantages of the present invention clearer and more specific, the present invention will be further described in detail below with reference to embodiments. It should be understood that the specific embodiments described herein are merely illustrative of the present invention and are not intended to limit the present invention.

Embodiment 1

Figure 1:
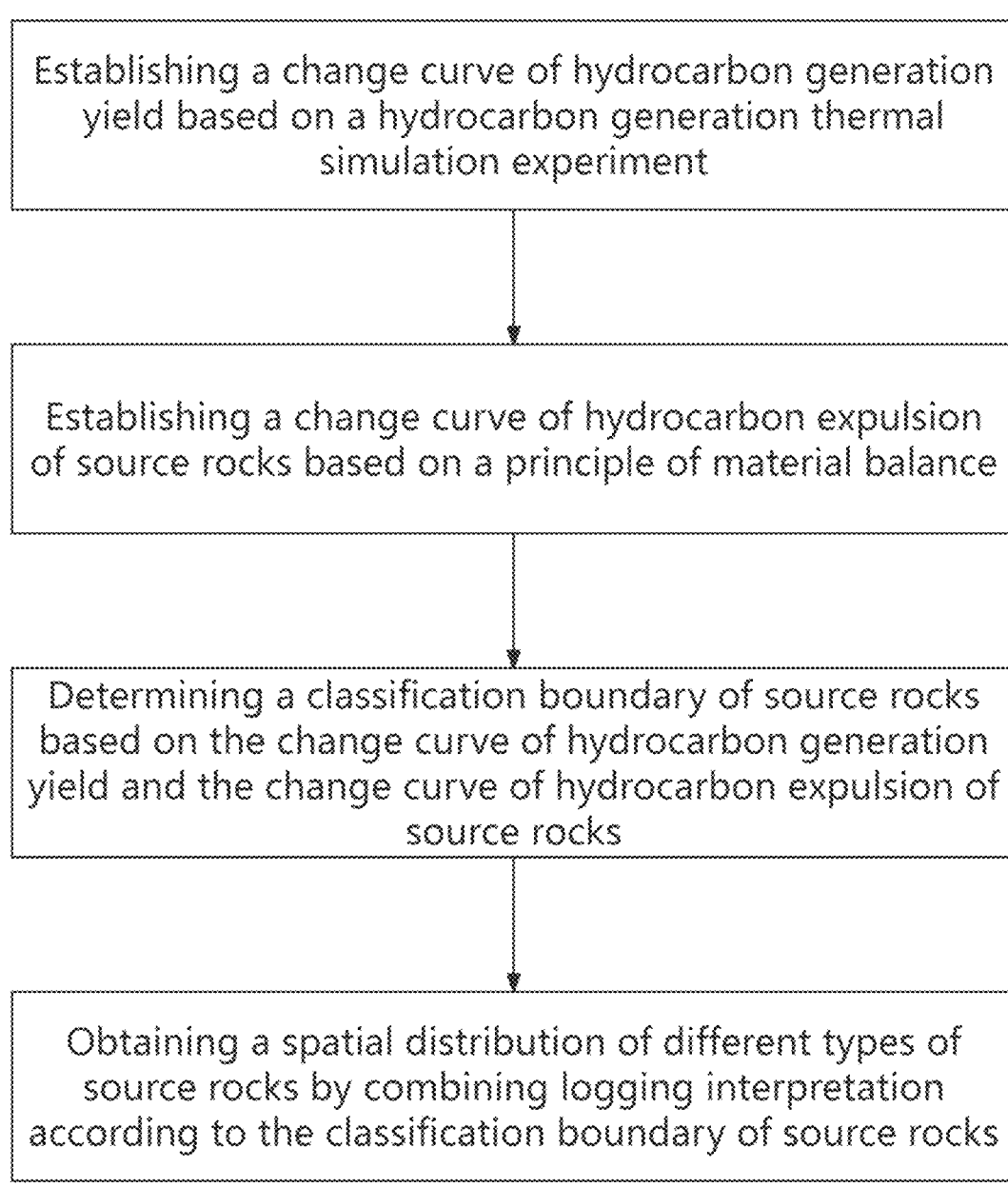
FIG. 1 is a schematic flow diagram of a grading evaluation method for high-maturity gas source rock based on hydrocarbon generation and expulsion simulation provided by an embodiment of the present invention.

A grading evaluation method for high-maturity gas source rock based on hydrocarbon generation and expulsion simulation, as shown in FIG. 1, including:
a change curve of hydrocarbon generation yield is established based on a hydrocarbon generation thermal simulation experiment;
a change curve of hydrocarbon expulsion of source rocks is established based on a principle of material balance;
a classification boundary of source rocks is determined based on the change curve of hydrocarbon generation yield and the change curve of hydrocarbon expulsion of source rocks;
a spatial distribution of different types of source rocks is obtained by combining logging interpretation according to the classification boundary of source rocks.

Embodiment 2

According to the grading evaluation method for high-maturity gas source rock based on hydrocarbon generation and expulsion simulation in embodiment 1, the difference is:

The source rock sample is preferably selected to carry out the hydrocarbon generation thermal simulation experiment to establish the change curve of hydrocarbon generation yield under different maturities; including:
firstly, geochemical test data of the source rock of a target layer is sorted out in a study area, and geochemical index characteristics of a source rock TOC, a maturity, an organic matter type, a residual hydrocarbon S1, a cracked hydrocarbon S2, S3, Tmax, a hydrogen index HI are analyzed; source rock samples with high organic matter abundance and low maturity (sample size>460 g) are selected in the target layer, and based on SY/T 7035-2016 standard, the hydrocarbon generation thermal simulation experiment is carried out to obtain a hydrocarbon generation volume at different evolution stages (that is, different maturities), information of the residual TOC, S1, S2 and hydrogen index HI of the experimental samples at different maturities is obtained by testing;

the original TOC and original HI of the experimental samples are restored by using a theory of material balance;

based on experimentally obtained hydrogen index HI at different maturities and the restoration of the original HIo, an optimized fitting equation is used to fit the hydrogen index HI at a low-maturity stage, and a distribution curve of the hydrogen index HI in a whole maturity range is obtained;

an original HIo is used to minus the hydrogen index HI at different maturities, a hydrocarbon generation yield of the source rock is calculated;

characteristics of hydrocarbon generation components are obtained by combining the hydrocarbon generation simulation experiment, a relative proportion change of the hydrocarbon generation components at the low-maturity stage is obtained by fitting a change trend of the relative proportion of different components, the change curve of the hydrocarbon generation (oil and gas) yield at the low-maturity stage is obtained, and finally, the change curve of the hydrocarbon generation (oil and gas) yield in different maturity stages is obtained.

The original TOC and original HI of the experimental samples are restored by using a theory of material balance; including:

Based on Cools (1986)'s theory that the inert carbon content in kerogen does not change during evolution, an original organic carbon content $TOC_o$ and an original hydrogen index HIo are restored, as shown in Equation (1):

$$TOC_o \times (1-D_o) = TOC_i \times (1-D_i) \qquad (1)$$

in Equation (1), $TOC_o$ and $TOC_i$ denote an original organic carbon content of the sample and a current organic carbon content of the sample respectively, %; $D_o$ and $D_i$ denote an original degradation rate and a residual degradation rate respectively, which represent a ratio of effective carbon Cp and organic carbon Ct of the source rock; the original degradation rate $D_o$ is related to an organic matter type of the source rock, according to the Tmax and HI data obtained from an investigation of a study area, the source rock type is identified, and the original degradation rate $D_o$ of the sample is selected; wherein the general percentage of carbon in hydrocarbons is 83%, it can be considered as 0.083; 0.083 is the conversion coefficient from carbon (%) to hydrocarbon volume (mg/g), the effective carbon Cp is obtained by using a conversion coefficient of carbon conversion to hydrocarbon volume, and then $D_i$ is obtained, as shown in Equation (2):

$$Di = Cp/Ct = ((S1+S2) \times 0.083)/TOCi \qquad (2)$$

where S1 is residual hydrocarbon; S2 is cracked hydrocarbon;

a calculation formula of an original hydrocarbon generation potential S2o of the sample is shown in Equation (3):

$$S2o = (TOCo \times Do)/0.083 \qquad (3)$$

the restored original hydrogen index HIo is shown in Equation (4) as follows:

$$HIo = S2o/TOCo \qquad (4)$$

Based on experimentally obtained hydrogen index HI at different maturities and the restoration of the original HIo, the optimized fitting equation is used to fit the hydrogen index HI at the low-maturity stage, and the distribution curve of the hydrogen index HI in the whole maturity range is obtained; including:

in the above step of establishing an evolution curve of hydrogen index, based on the original hydrogen index HIo, and HIi data of source rocks at different maturity stages in hydrocarbon generation thermal simulation experiments, determining the evolution curve of hydrogen index at low-maturity stage by an optimized fitting method, a fitting equation is shown in Equation (5):

$$HI(R_o) = \frac{HIo}{1 + \exp\left(\theta * \ln\left(\frac{Ro}{\beta}\right)\right)} \qquad (5)$$

in Equation (5), HIo is an original hydrogen index, θ and β are dimensionless parameters, which represent a range of hydrocarbon generation and a peak of hydrocarbon generation; the original HIo is used to minus the hydrogen index HI at different maturities, the hydrocarbon generation yield of the source rock is calculated; according to the hydrocarbon generation thermal simulation experiment, the hydrocarbon generation yield of the source rock sample after the current maturity is obtained to splice the hydrocarbon generation yield of the source rock to obtain the distribution curve of the hydrocarbon generation yield in a complete maturity range.

The change curve of hydrocarbon expulsion of source rocks is established based on the principle of material balance; including:

based on GB/T 35210.2-2020 standard, an isothermal adsorption experiment of methane in source rock samples is carried out, and an evaluation model of methane adsorption gas in source rock is established by combining TOC, strata pressure and temperature;

an evaluation model of free gas is established by using a gas state equation by combining collected data of a source rock porosity, water saturation, strata temperature, pressure, a gas compression factor and a rock sample density, and then an evaluation model of source rock retained gas is obtained;

a relationship between the maturity and a burial depth, a strata temperature and pressure is established according to a burial and thermal history to obtain a maximum retained gas volume distribution curve of source rock under different maturities; according to the method for generation-retained-expulsion, according to a relationship between hydrocarbon generation volume curve and the maximum retained gas curve under different maturities, a change curve of hydrocarbon expulsion volume under different maturities is calculated.

The Langmuir equation is used to establish the evaluation model of adsorption gas, including: the establishment of the evaluation model of methane adsorption gas in source rock, including:

several source rock samples with different abundances are selected to carry out the methane isothermal adsorption experiment to obtain a Langmuir volume $V_L$ and Langmuir pressure $P_L$, a relationship between $V_L$ and $P_L$ with TOC, temperature and clay minerals is analyzed, and calculation models of $V_L$ and $P_L$ are established by preferred indexes; according to the current TOC and strata pressure, temperature, clay mineral parameters, an adsorption gas volume $V_{adsorption}$ of the source rock is obtained by using the Langmuir equation; as shown in Equation (6):

$$V_{adsorption}=(V_L P)/(P+P_L)=h_1(P,T,TOC,clay) \qquad (6)$$

in Equation (6), T is a strata temperature, K; $V_L$ is a Langmuir volume, which represents a maximum methane adsorption capacity, cm³/g; $P_L$ is a Langmuir pressure, Mpa; P is a strata pressure, Mpa; $V_{adsorption}$ is an adsorption gas volume, cm³/g; clay is a clay content, %.

The established evaluation model of methane adsorption gas in source rock, that is, the calculation model of $V_L$ and $P_L$, is shown in Equation (6) above.

The establishment of the evaluation model of free gas by using the gas state equation, including:

the content of free gas is mainly related to temperature, pressure, rock porosity, gas saturation and gas compression factor, a content of free gas is obtained by using an ideal gas state equation; as shown in Equation (7):

$$V_{free} = h_2(P, T, \varphi, Sw, Z) = \frac{P\varphi(1-Sw)ZoTo}{PoZT\rho} \qquad (7)$$

in Equation (7), $\varphi$ is a porosity of source rock, decimal, derived by collecting porosity test values of source rock under different maturities, and establishing a relationship between porosity and maturity evolution by fitting; P is strata pressure, MPa; Po is pressure under a standard condition, MPa; T is a strata temperature, K; To is a surface temperature, K; Sw is a water saturation, decimal, derived by collecting measured water saturation data of source rock samples, and establishing a relationship between water saturation and maturity and clay content; Z and Zo are methane compression factors under strata conditions and standard atmospheric pressure, obtained by industry standard query; $\rho$ is a density of rock sample, g/cm³;

the established evaluation model of free gas is shown in Equation (7) above.

Under the same maturity, the adsorbed gas volume plus the free gas volume to obtain the retained gas volume, that is, $V_{retained}=V_{adsorption}+V_{free}$, so as to calculate and obtain the evaluation model of retained gas in source rock under different maturities.

The change curve of hydrocarbon expulsion volume is calculated under different maturities; including:

combined with the change curve of hydrocarbon generation yield, the relationship between the maturity and the burial depth, strata temperature and pressure is established according to the burial and thermal history to obtain the maximum retained gas volume distribution curve of source rock under different maturities; the method for generation-retained-expulsion is used, according to the relationship between the gas generation curve and the maximum retained gas curve under different maturities, the change curve of hydrocarbon expulsion volume under different maturities is obtained; as shown in Equation (8):

$$V_{hydrocarbon\ expulsion}=V_{gas\ generation}-V_{retained}= V_{gas\ generation}-(V_{adsorption}+V_{free}) \qquad (8)$$

in Equation (8), $V_{gas\ generation}$ is a gas generation volume at a certain maturity; $V_{hydrocarbon\ expulsion}$ is a hydrocarbon expulsion volume under a certain maturity of the source rock; a retained gas volume is a sum of free gas and adsorbed gas, the maturity, strata temperature and strata pressure under different burial depths are obtained according to the evaluation model of adsorbed gas and the evaluation model of free gas, and combined with the burial and thermal history of the study area, a relationship between burial depth and temperature, maturity and strata pressure is established by the equation fitting to obtain the distribution curve of maximum retained gas volume in source rock under different maturities; the method for generation-retained=expulsion is used, according to the relationship between the gas generation curve and the maximum retained gas curve under different maturities, an evaluation of hydrocarbon expulsion of source rocks under different maturities is realized;

the hydrocarbon generation yield $A_{hydrocarbon\ generation\ i}$ under a certain maturity Roi is obtained by using the obtained hydrocarbon generation yield curve, combined with the original TOCo of the source rock, the gas generation volume $V_{gas\ generation}$ i of the source rock under a certain maturity is calculated, the gas generation curve is obtained by calculating the gas generation volume under different maturities; as shown in Equation (9):

$$V_{gas\ generation} = A_{hydrocarbon\ generation} \times \frac{TOCo}{100}/\rho_{methane} \qquad (9)$$

where, $\rho_{methane}$ is a methane density under a standard condition, 0.000717 g/cm³;

the change curve of hydrocarbon expulsion of source rock is calculated according to the change of gas generation volume and gas retained volume in source rock under different maturities; it means that when the gas generation volume is less than or equal to the maximum retained gas volume at a certain maturity, there is no methane gas discharged from the source rock, and the hydrocarbon expulsion volume is 0; when the volume of gas generated is greater than the maximum retained gas volume of the source rock, gas expulsion begins, and the hydrocarbon expulsion volume is greater than 0.

The classification boundary of source rocks is determined based on the change curve of hydrocarbon generation yield and the change curve of hydrocarbon expulsion of source rocks; including:

a distribution range of source rock maturity and TOC in the study area is analyzed, and a series of maturity values (M maturity value(s)) and corresponding TOC values (N TOC value(s)) is preferably selected according to a certain step size, for any TOCi, an original TOC is restored according to Equation (1), the change curves of gas generation and hydrocarbon expulsion volume are established respectively according to Equation (9)

and Equation (8), the $V_{gas\ generation\ ij}$ (when corresponding to TOCj and Roi) and $V_{hydrocarbon\ expulsion\ ij}$ (when corresponding to TOCj and Roi) corresponding to Roj are extracted and the hydrocarbon expulsion efficiency $K_{ij}=V_{hydrocarbon\ expulsion\ ij}/V_{gas\ generation\ ij}$ is calculated, a change curve of hydrocarbon expulsion efficiency with $TOC_i$ under a certain maturity Roj is established, that is, a hydrocarbon expulsion efficiency curve;

when the hydrocarbon expulsion efficiency curve begins to be greater than 0, the corresponding TOCi value is a lower limit of the effective source rock at this maturity; when the change rate of hydrocarbon expulsion efficiency at two adjacent points begins to be less than 10%, the corresponding TOC value is the lower limit of the high-quality source rock at this maturity; it is considered that under this maturity, the effective source rock is evaluated when the original TOC value is greater than the lower limit of the effective source rock, and less than the lower limit of the high-quality source rock; the high-quality source rock is evaluated when the original TOC value is greater than the lower limit of the high-quality source rock; the change curve of hydrocarbon expulsion efficiency with TOCi under different maturities is obtained by changing Roj; a classification boundary of effective source rock and high-quality source rock is obtained under different maturities according to a source rock boundary division method in the above steps.

The spatial distribution of different types of source rocks is obtained by combining logging interpretation according to the classification boundary of source rocks; including:

based on an improved ΔlgR technology, combined with acoustic and resistivity curves, a regression analysis is carried out according to the formula TOC=a*lgRT+ b*AC+C, so as to obtain a, b, c in a TOC interpretation model, and a prediction model of source rock organic matter abundance is established;

the maturity under different burial depths is obtained by combining the burial and thermal history of the study area, and a relationship between maturity and burial depth is obtained by fitting the maturity and burial depth;

an organic carbon content under different burial depths is obtained by using the source rock organic matter abundance model established by acoustic and resistivity curve; a maturity under different burial depths is obtained according to a relationship between maturity and burial depth; a vertical distribution of effective source rocks and high-quality source rocks in multiple wells is identified by combining a classification boundary of source rocks under different maturities; and a spatial distribution characterization of different types of source rock thickness in the study area is realized by counting thickness of different types of source rocks in multiple wells and combining well coordinates.

If the sample is at the high-maturity stage, that is, Ro>1.5%, combined with the hydrocarbon generation thermal simulation experiment, the yield of oil and gas at different maturities is obtained; a proportion distribution method is used to divide the hydrocarbon generation (oil and gas) products at the low-mature-mature stage (Ro<1.5), a proportion of products at the low-mature-mature stage is divided by extending the trend line according to an evolution trend of the proportion of simulation experiment products; finally, a complete hydrocarbon generation (oil, gas) yield change curve is obtained.

Embodiment 3

Figure 2:
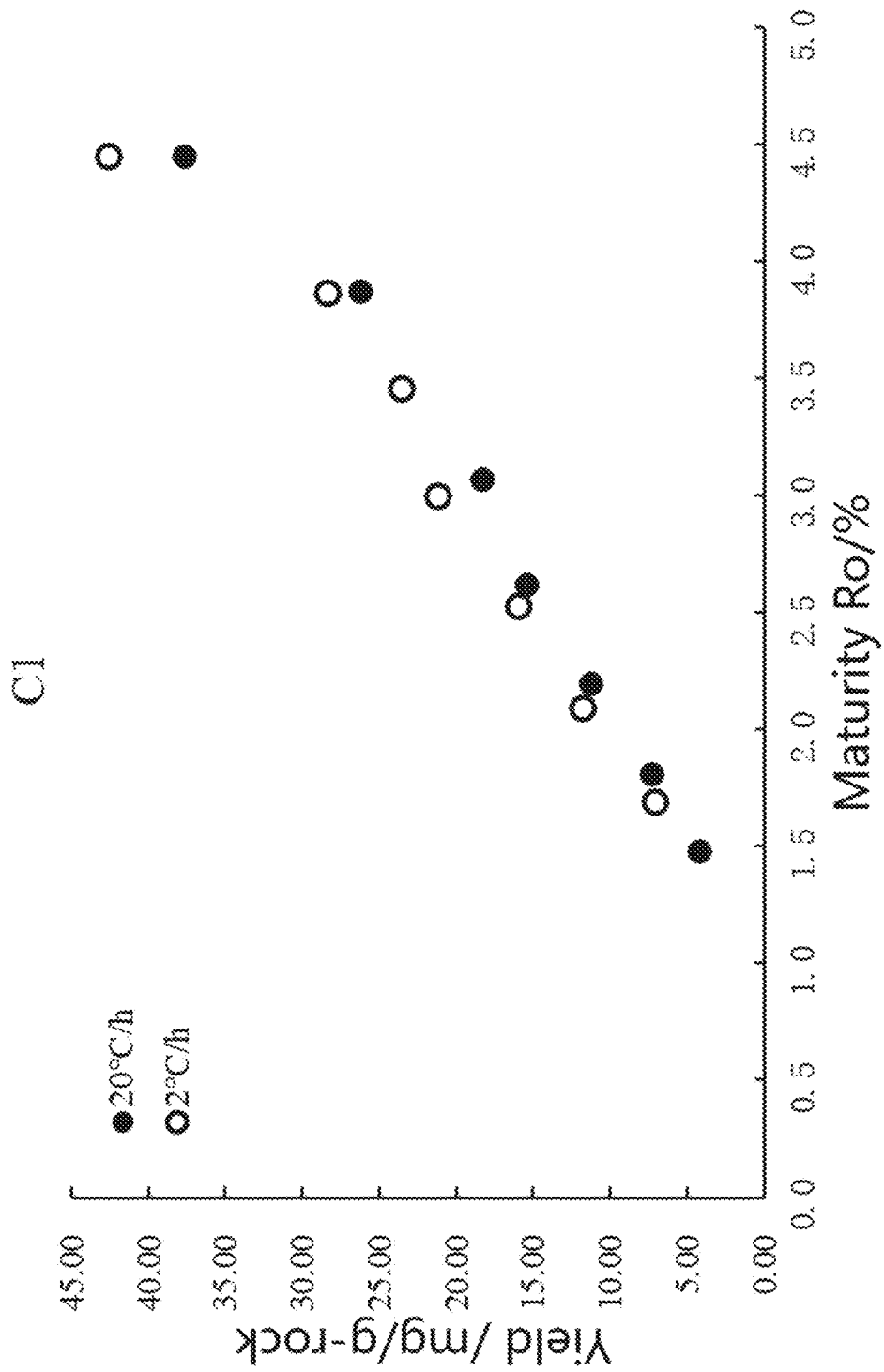
FIG. 2 is a schematic diagram of a change curve of methane yield with maturity obtained by carrying out a hydrocarbon generation thermal simulation experiment on a source rock sample provided by an embodiment of the present invention.
Figure 3:
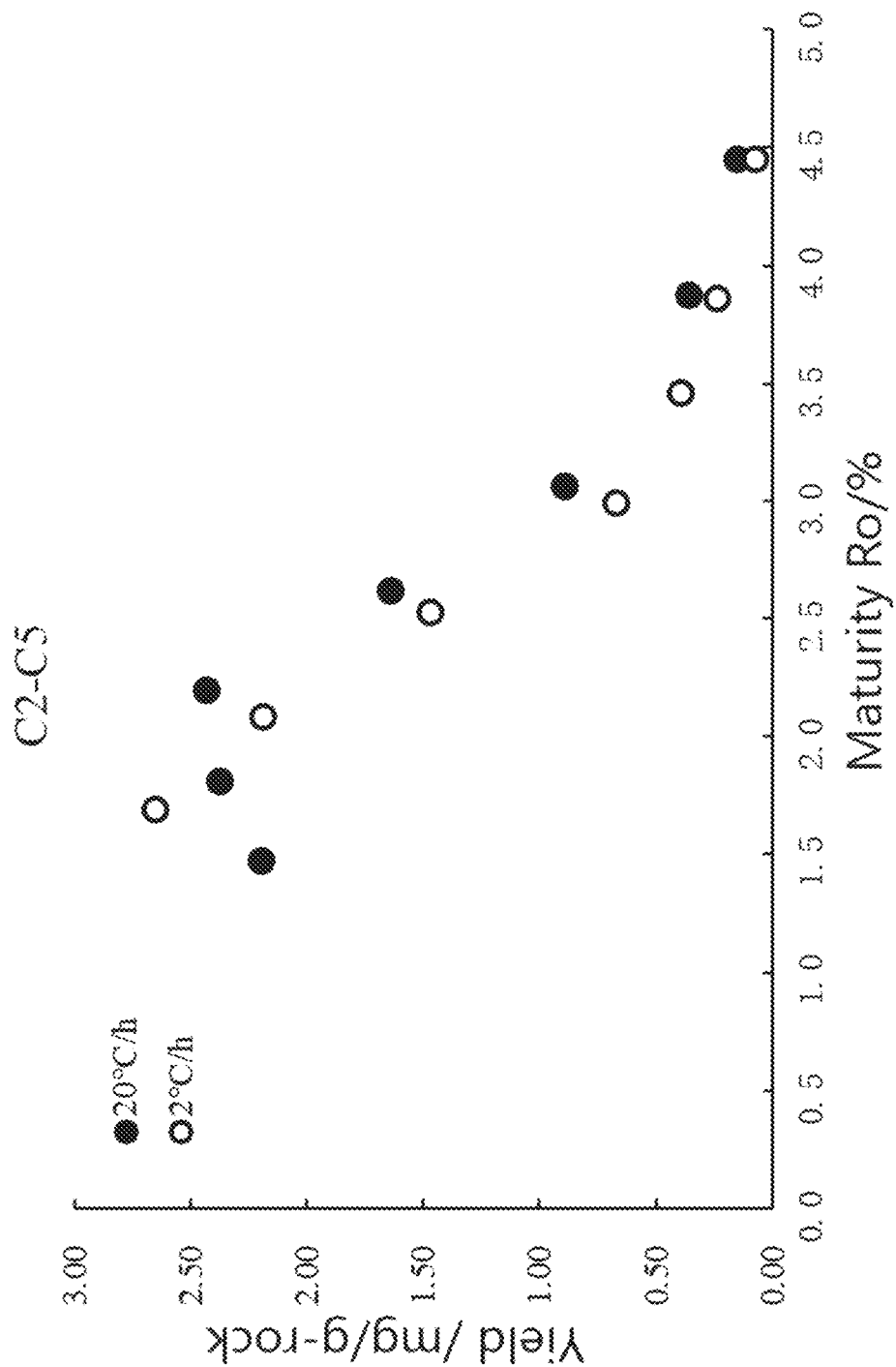
FIG. 3 is a schematic diagram of a change curve of heavy hydrocarbon gas yield with maturity obtained by carrying out a hydrocarbon generation thermal simulation experiment on a source rock sample provided by an embodiment of the present invention.
Figure 4:
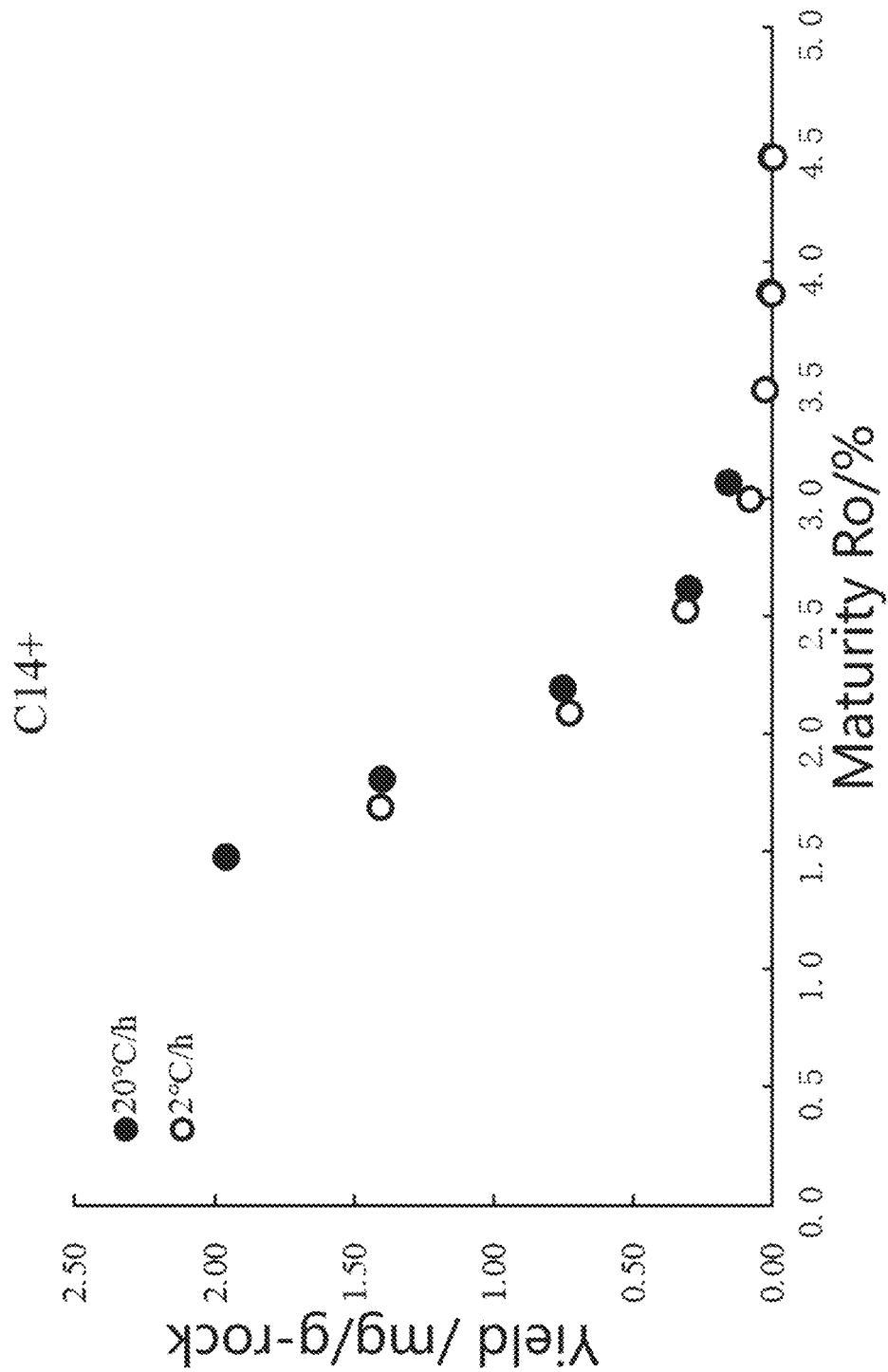
FIG. 4 is a schematic diagram of a change curve of light crude oil yield with maturity obtained by carrying out a hydrocarbon generation thermal simulation experiment on a source rock sample provided by an embodiment of the present invention.
Figure 5:
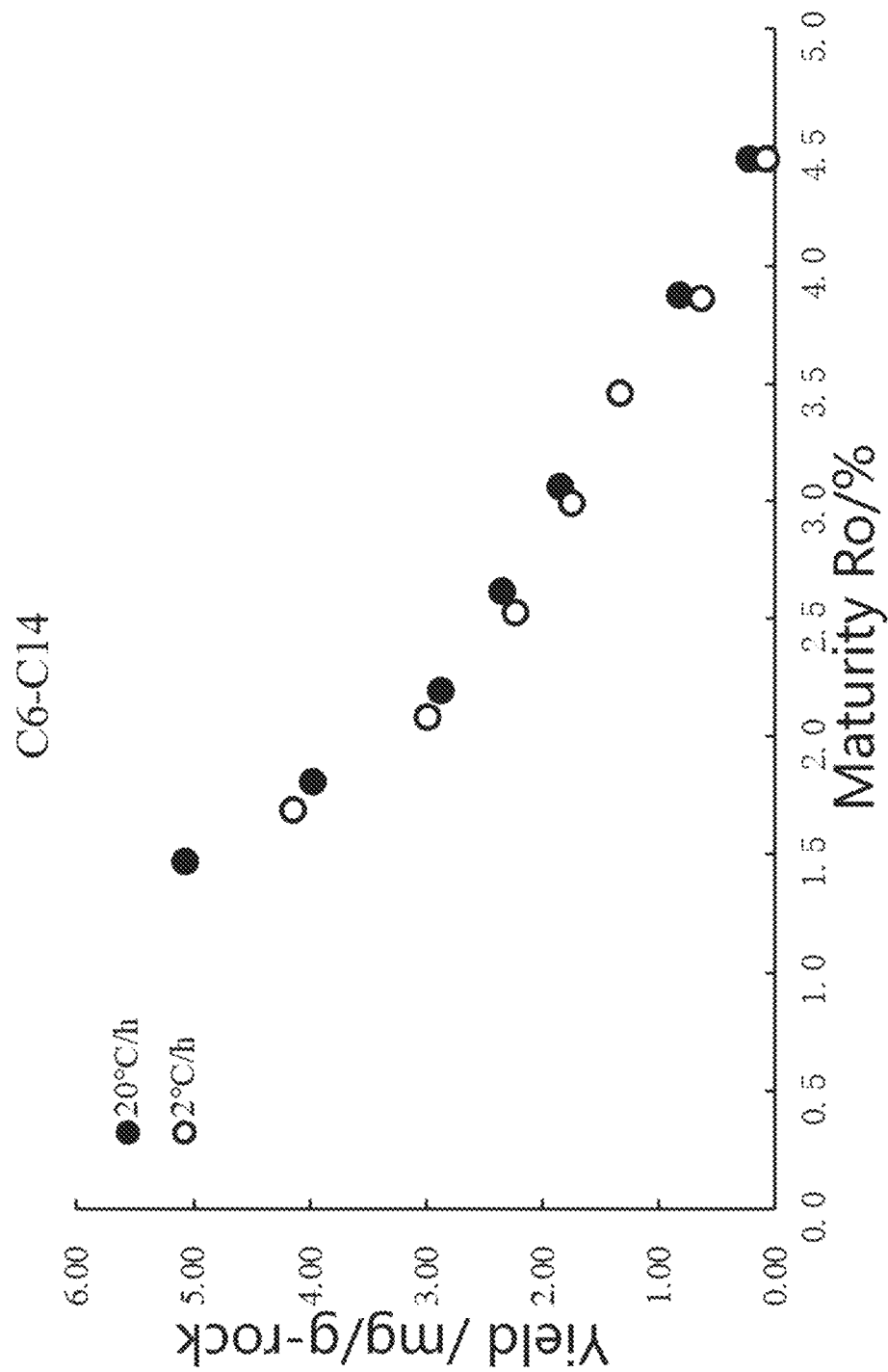
FIG. 5 is a schematic diagram of a change curve of heavy crude oil yield with maturity obtained by carrying out a hydrocarbon generation thermal simulation experiment on a source rock sample provided by an embodiment of the present invention.

According to the grading evaluation method for high-maturity gas source rock based on hydrocarbon generation and expulsion simulation in embodiment 2, the difference is:

according to years of exploration and development, the tight gas of Xujiahe Formation in Sichuan Basin has been commercially exploited, and the distribution of high-yield areas of tight gas is controlled by the distribution of high-quality gas source rocks. The Xujiahe Formation source rocks in the Sichuan Basin have a high degree of thermal evolution, the maturity of the source rocks is widely distributed (0.7%-2.5%), and most of the source rocks are high maturity-over maturity source rocks. The source rocks are mainly type III, with a small amount of type $II_2$, and the organic carbon abundance is high, roughly distributed in 1%-4%. The fifth member of Xujiahe Formation in Sichuan Basin is taken as an example to illustrate the specific steps of the implementation of the present invention:

(1): a change curve of hydrocarbon generation yield is established based on a hydrocarbon generation thermal simulation experiment;

1) a source rock sample is selected from the Xujiahe Formation in the Sichuan Basin, and a hydrocarbon generation thermal simulation experiment is carried out based on the SY/T 7035-2016 standard, the samples are from the fifth member of Xujiahe Formation in Yongqian 7 well, Sichuan Basin, with a depth of 2427 m and a sample amount of 464.9 g, the current TOC, Tmax, S1, S2, HI and other information of the source rock samples are obtained based on geochemical test analysis; in the hydrocarbon generation thermal simulation experiment, the samples are divided into two sets, and two heating rates of 20° C./h and 2° C./h are used respectively, seven temperature points are set in each set, and the final temperature of the simulation is between 456.0° C. and 648.0° C., the products are collected and quantitatively analyzed at each temperature point. The hydrocarbon generation thermal simulation experiment is carried out on the samples, and the hydrocarbon generation yields at seven maturity levels are obtained in each set, wherein the hydrocarbon generation products included methane C1, heavy hydrocarbon gas C2-C5, light crude oil C6-C14 and heavy crude oil C14+. FIG. 2 is a schematic diagram of a change curve of methane yield with maturity obtained by carrying out a hydrocarbon generation thermal simulation experiment on a source rock sample provided by an embodiment of the present invention; FIG. 3 is a schematic diagram of a change curve of heavy hydrocarbon gas yield with maturity obtained by carrying out a hydrocarbon generation thermal simulation experiment on a source rock sample provided by an embodiment of the present invention; FIG. 4 is a schematic diagram of a change curve of light crude oil yield with maturity obtained by carrying out a hydrocarbon generation thermal simulation experiment on a source rock sample provided by an embodiment of the present invention; FIG. 5 is a schematic diagram of a change curve of heavy crude oil yield with maturity obtained by carrying out a hydrocarbon generation thermal simulation experiment on a source rock sample provided by an embodiment of the present invention;

2) the original TOC and HI are restored by the material balance method. According to Cools (1986)'s theory that the inert carbon content in kerogen does not change during the evolution, Equation (4) is restored for the original organic carbon content TOCo Equation (1) and the original hydrogen index HI are restored, wherein the residual degradation rate of the sample is:

$$Di=Cp/Ct=((S1+S2)\times 0.083)/TOCi=0.0404$$

the organic matter types of the samples are classified based on the Tmax and HI information of the source rock samples obtained from the previous investigation of the Xujiahe Formation in the Sichuan Basin. The sample is type II1 organic matter, and the original degradation rate Do is about 50% based on type II1 organic matter, according to Equation (1), the original organic carbon content TOCo of the sample is:

$$TOCo=(TOCi\times(1-Di))/(1-Do)=39.02\%$$

therefore, the original hydrocarbon generation potential S2o of the sample is:

$$S2o=(TOCo\times Do)/0.083=47.02 \text{ mg/g};$$

the original hydrogen index is:

$$HIo=S2o/TOCo=120.48 \text{ mg/g TOC}$$

Figure 6:
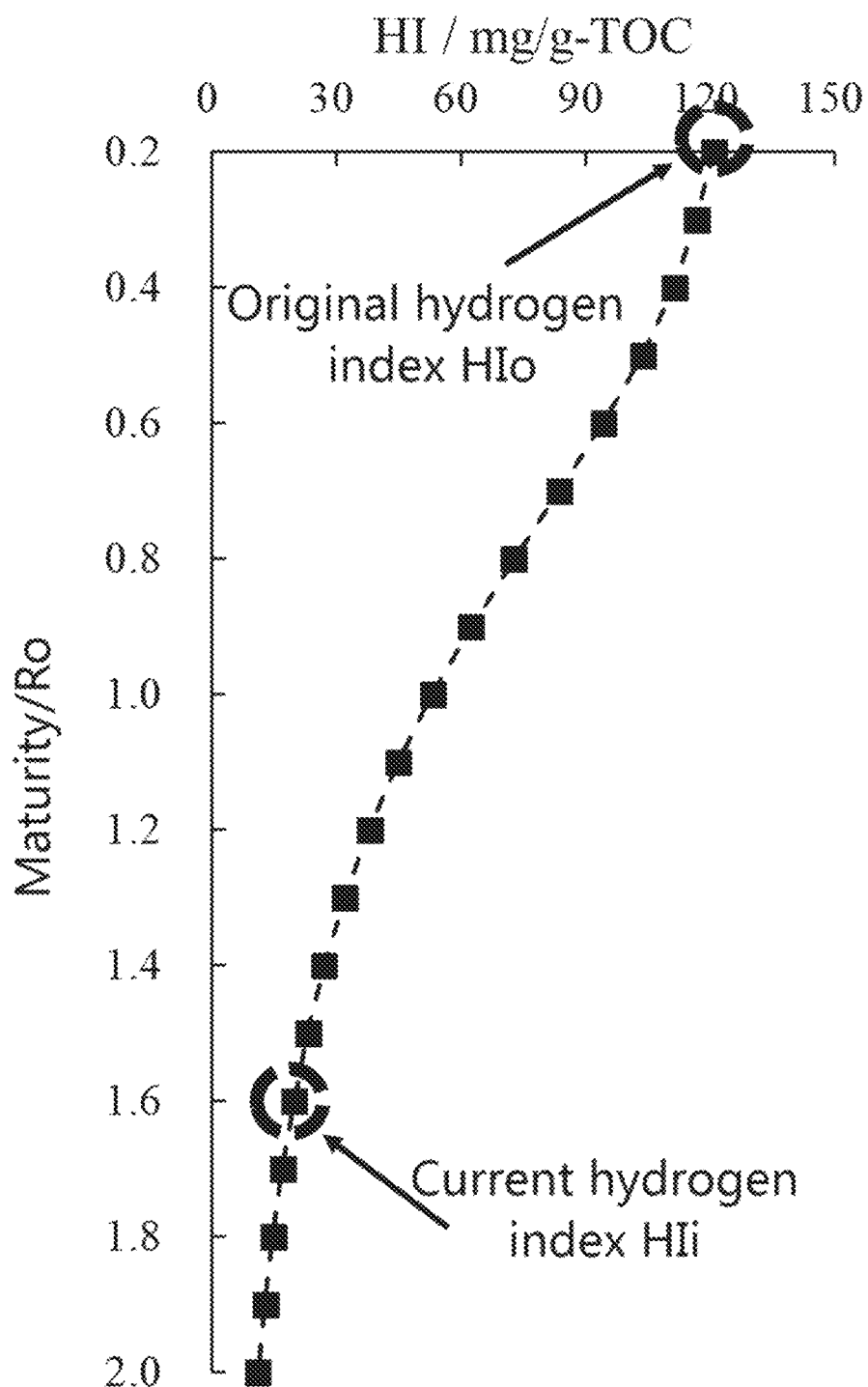
FIG. 6 is a schematic diagram of a hydrogen index change curve of a source rock sample at different maturity degrees provided by an embodiment of the present invention.

3) the evolution curve of hydrogen index is established, with the adoption of Chen et al. proposed a hydrogen index calculation model based on rock pyrolysis data analysis in 2015, based on the original hydrogen index HIo and the HIi data of source rocks with different maturities in hydrocarbon generation thermal simulation experiment, the evolution curve of hydrogen index at the low-maturity stage is determined by optimization fitting method, the fitting equation is:

$$HI(Ro) = \frac{HIo}{1+\exp\left[\theta * \ln\left(\frac{Ro}{\beta}\right)\right]} = 120.48/((1+\exp(2.96 * \ln(Ro/0.92)));$$

in the equation, HIo is an original hydrogen index, $\theta$ and $\beta$ are dimensionless parameters, which represent a range of hydrocarbon generation and a peak of hydrocarbon generation; based on the distribution of the original hydrogen index HIo and the current hydrogen index HIi, the values of $\theta$ and $\beta$ are 2.96 and 0.92 by fitting, respectively. The hydrogen index HI and evolution trend of different maturities can be obtained by inputting maturity Ro (0.5/0.6); FIG. 6 is a schematic diagram of a hydrogen index change curve of a source rock sample at different maturity degrees provided by an embodiment of the present invention.

Figure 7:
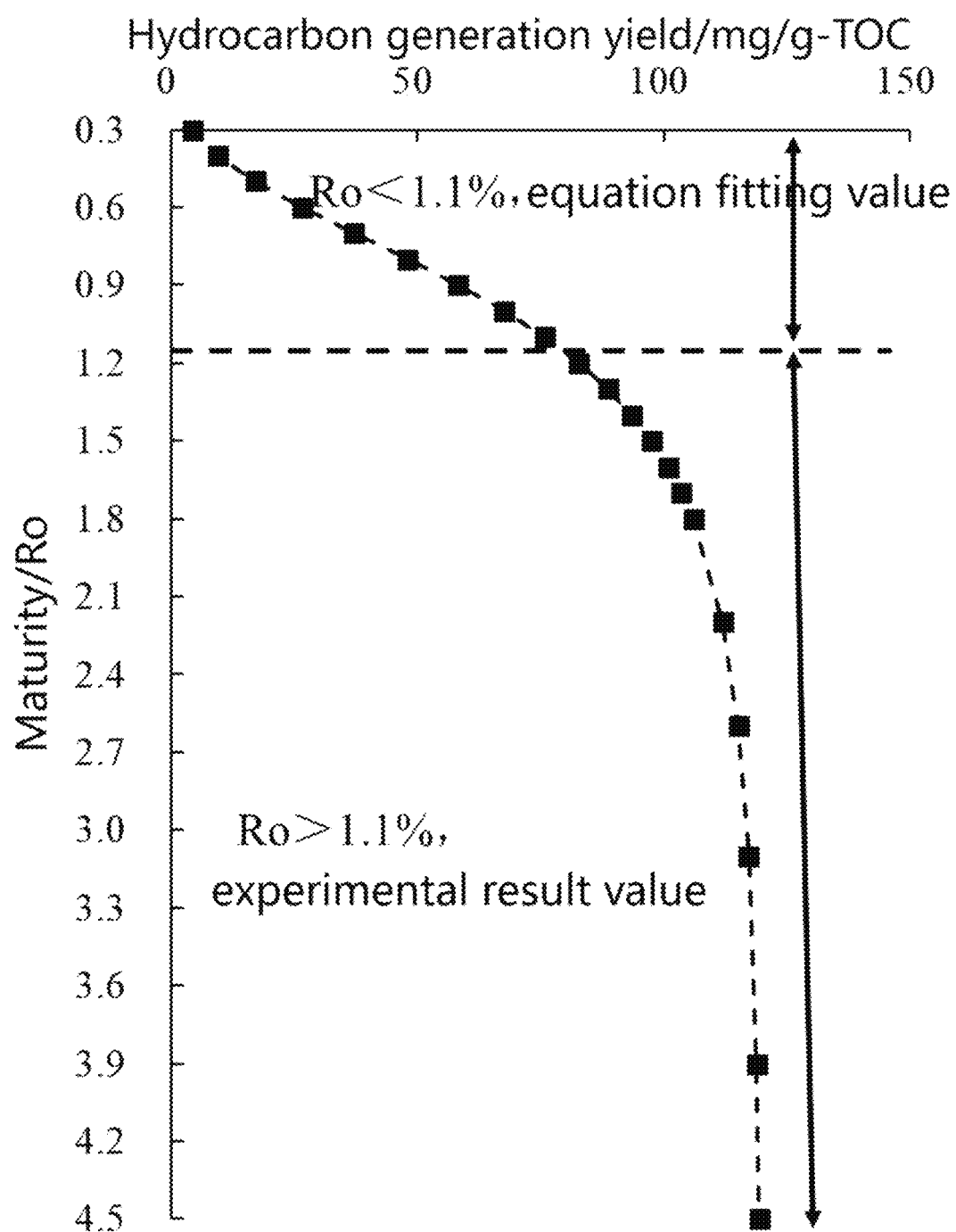
FIG. 7 is a schematic diagram of a change curve of hydrocarbon generation yield of a source rock sample at different maturity degrees provided by an embodiment of the present invention.
Figure 8:
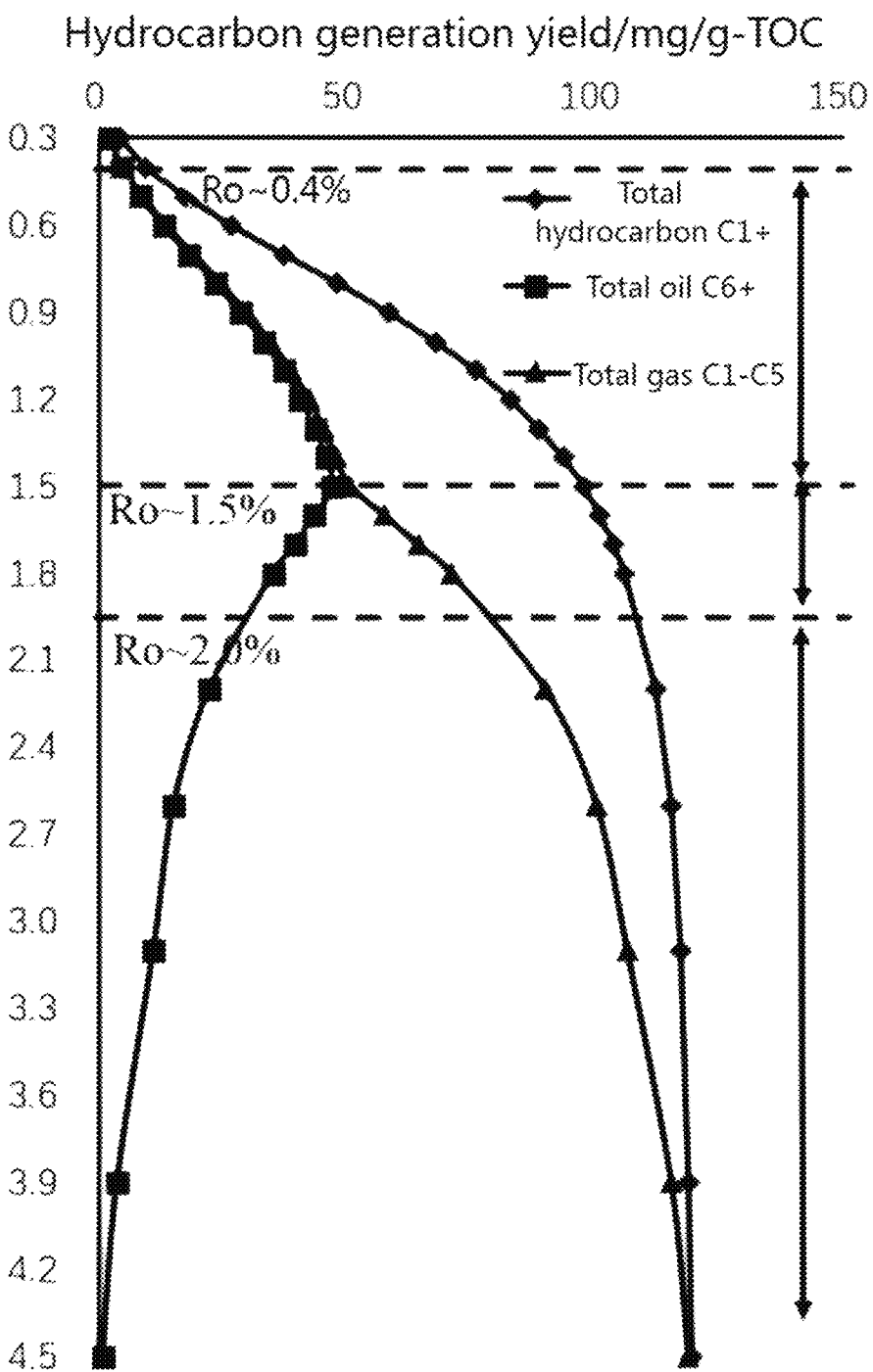
FIG. 8 is a schematic diagram of a change curve of hydrocarbon generation yield of different product components of a source rock sample at different maturity degrees provided by an embodiment of the present invention.

Through the change curve of hydrogen index HI in the overall maturity interval obtained in the above steps, the original HIo is used to minus the HIi index at different maturities, and the hydrocarbon generation yield of source rock at different maturity is calculated; FIG. 7 is a schematic diagram of a change curve of hydrocarbon generation yield of a source rock sample at different maturity degrees provided by an embodiment of the present invention; the proportional distribution method is adopted, combined with the characteristics of hydrocarbon generation components at the lower-maturity stage of the source rock, the change trend of the relative proportion of different components is fitted, and the relative proportion of hydrocarbon generation components at the low-maturity stage is obtained, and then the change curve of hydrocarbon generation (oil, gas) yield at the low-maturity stage is derived, and finally the change curve of hydrocarbon generation (oil, gas) yield in different maturity stages of the source rock sample is obtained; FIG. 8 is a schematic diagram of a change curve of hydrocarbon generation yield of different product components of a source rock sample at different maturity degrees provided by an embodiment of the present invention.

(2) A change curve of hydrocarbon expulsion of source rocks is established based on a principle of material balance 1) based on the Langmuir equation, the adsorption gas model is established to obtain the volume of adsorbed gas. According to the relevant experimental test data of the Xujiahe Formation in the Sichuan Basin in the study area, the Langmuir equation is used to establish the equation to fit the Langmuir volume $V_L$ and the Langmuir pressure $P_L$, and the relationship between $V_L$ and $P_L$ and the current TOC, temperature and clay content is established, the experiment showed that $V_L$ has a strong correlation with TOC and temperature, but has a poor correlation with clay mineral types. $P_L$ has a strong correlation with clay minerals, thereby obtaining:

$$V_L=0.3947*TOC*(-0.0098*T+2.1924)$$

$$P_L=0.098\text{clay}+1.9754$$

combined with strata temperature, pressure and other parameters, the adsorption gas model is obtained:

$$V_{adsorption}=h_1(P,T,TOC)=(VLP)/(P+PL)=\\((0.3947*TOC)*(-0.0098*T+2.1924)*P)/\\(0.098*\text{clay}+1.9754+P)$$

where $V_L$ is the Langmuir volume, which represents the maximum adsorption capacity, cm$^3$/g; $P_L$ is the Langmuir pressure, MPa; P is the strata pressure, MPa; T is the strata temperature, K; $V_{adsorption}$ is the adsorption capacity, cm$^3$/g; clay is the clay content, the value is 50%;

2) the free gas model of the source rock is established by using the gas state equation. Wherein, the content of free gas is mainly related to temperature, pressure and rock pore space, gas saturation and gas compression factor. According to the ideal gas state equation:

$$\rho_{free\ gas} = \frac{PM}{ZRT} \tag{10}$$

where P is the strata pressure, MPa; T is the strata temperature, K; M is the molar mass of gas, g/mol; Z is the gas compression factor; R is the gas constant, ml·atm/mol·K;

then the content of free gas can be obtained by equation (7):

$$V_{free} = h_2(P, T, \varphi, Sw, Z) = \frac{P\varphi(1-Sw)ZoTo}{PoZT\rho} = 1/\rho * \frac{\varphi(1-Sw)\rho_{free\ gas}}{\rho_{methane}}$$

where, porosity $\varphi$ is to collect the porosity test values of source rocks under different maturities, and establish the relationship between porosity and maturity evolution by fitting. The Xujiahe Formation in Sichuan Basin is taken as an example $\varphi=-1.8799Ro^2+2.7163Ro-0.5822$; Sw is water saturation, the relationship between water saturation and maturity is established according to the measured water saturation data of source rock samples, and the Xujiahe Formation in Sichuan Basin is obtained by equation fitting $Sw=1.913Ro^2+1.399Ro+0.4468$; $\rho$ is the density of rock samples, and the value is 2.6 g/cm$^3$; $\rho_{free\ gas}$ is the density of free gas, g/cm$^3$, which is obtained according to the ideal gas state equation formula (10). $\rho_{methane}$ is the methane density under standard conditions, and the value is 0.000717 g/cm$^3$;

3) change curve of hydrocarbon expulsion under different maturities $V_{hydrocarbon\ expulsion}$ is established. Combined with the change curve of hydrocarbon generation yield $V_{hydrocarbon\ generation}$, the relationship between the maturity and the burial depth, strata temperature and pressure is established according to the burial and thermal history to obtain the maximum retained gas volume distribution curve of source rock under different maturities; using the method for generation-retained=expulsion, according to the relationship between the gas generation curve and the maximum retained gas curve under different maturities, the change curve of hydrocarbon expulsion volume under different maturities is calculated.

Figure 9:
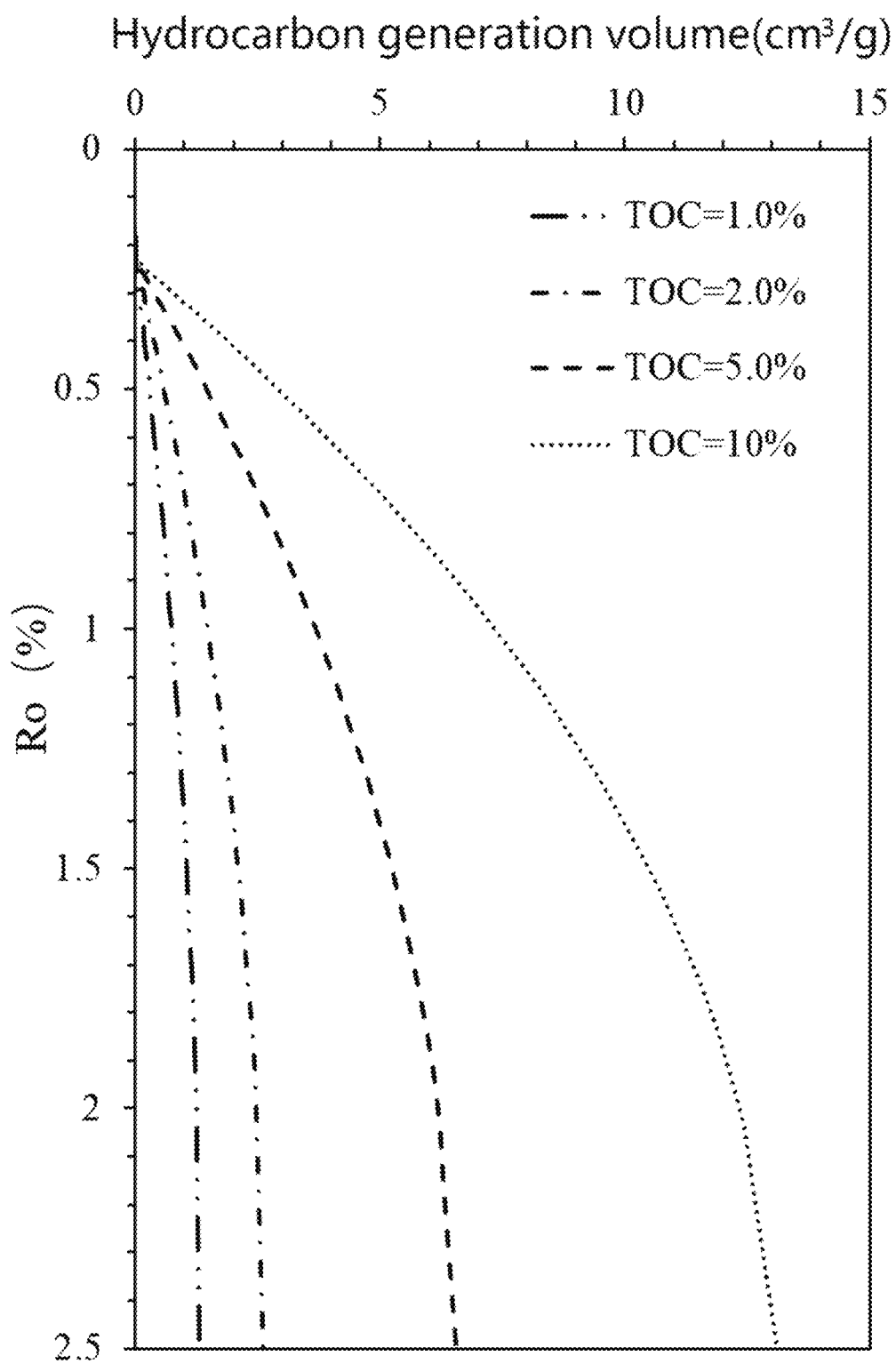
FIG. 9 is a schematic diagram of a change curve of hydrocarbon generation with maturity provided by an embodiment of the present invention.
Figure 10:
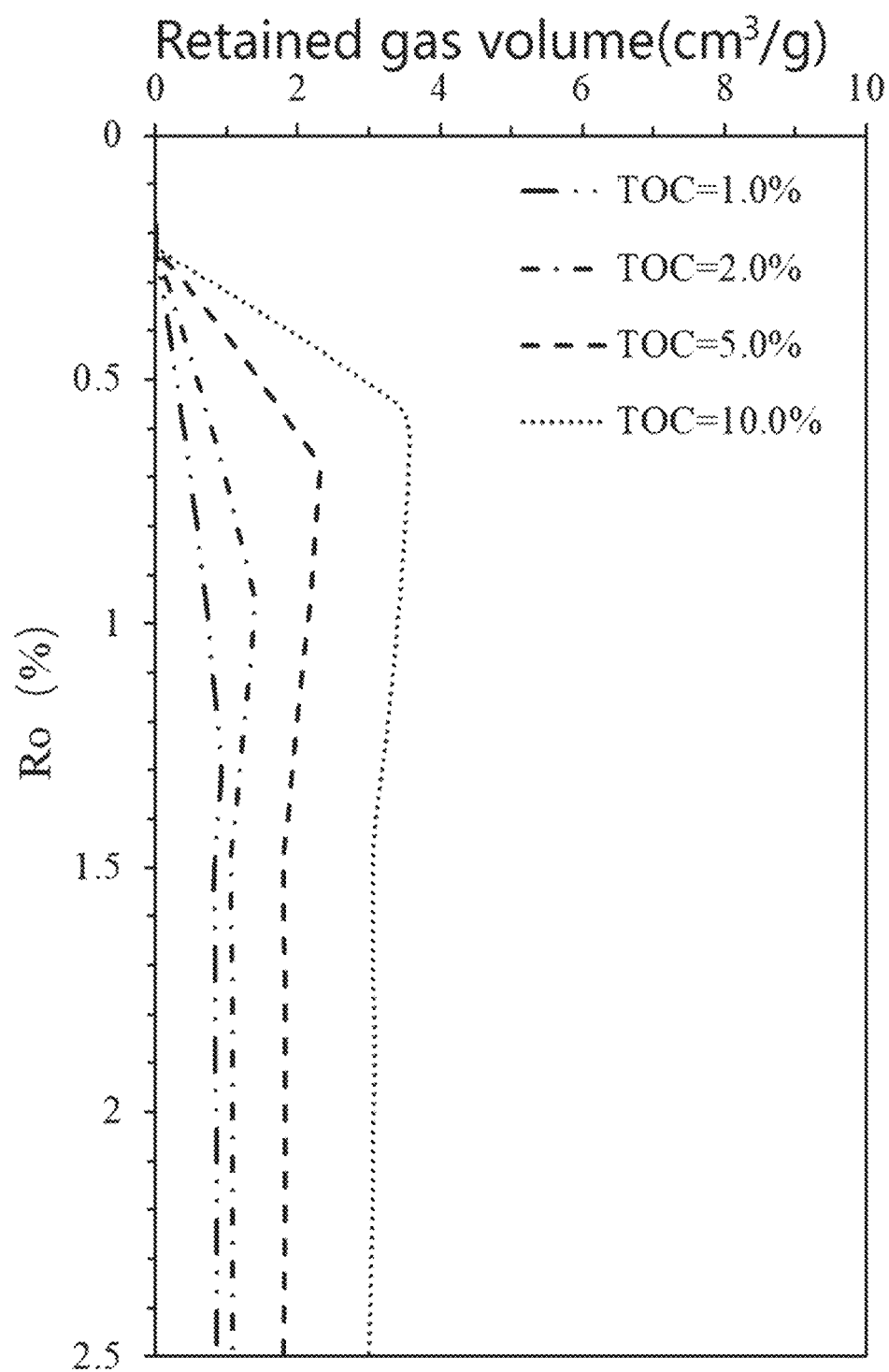
FIG. 10 is a schematic diagram of a change curve of retained gas volume with maturity provided by an embodiment of the present invention.
Figure 11:
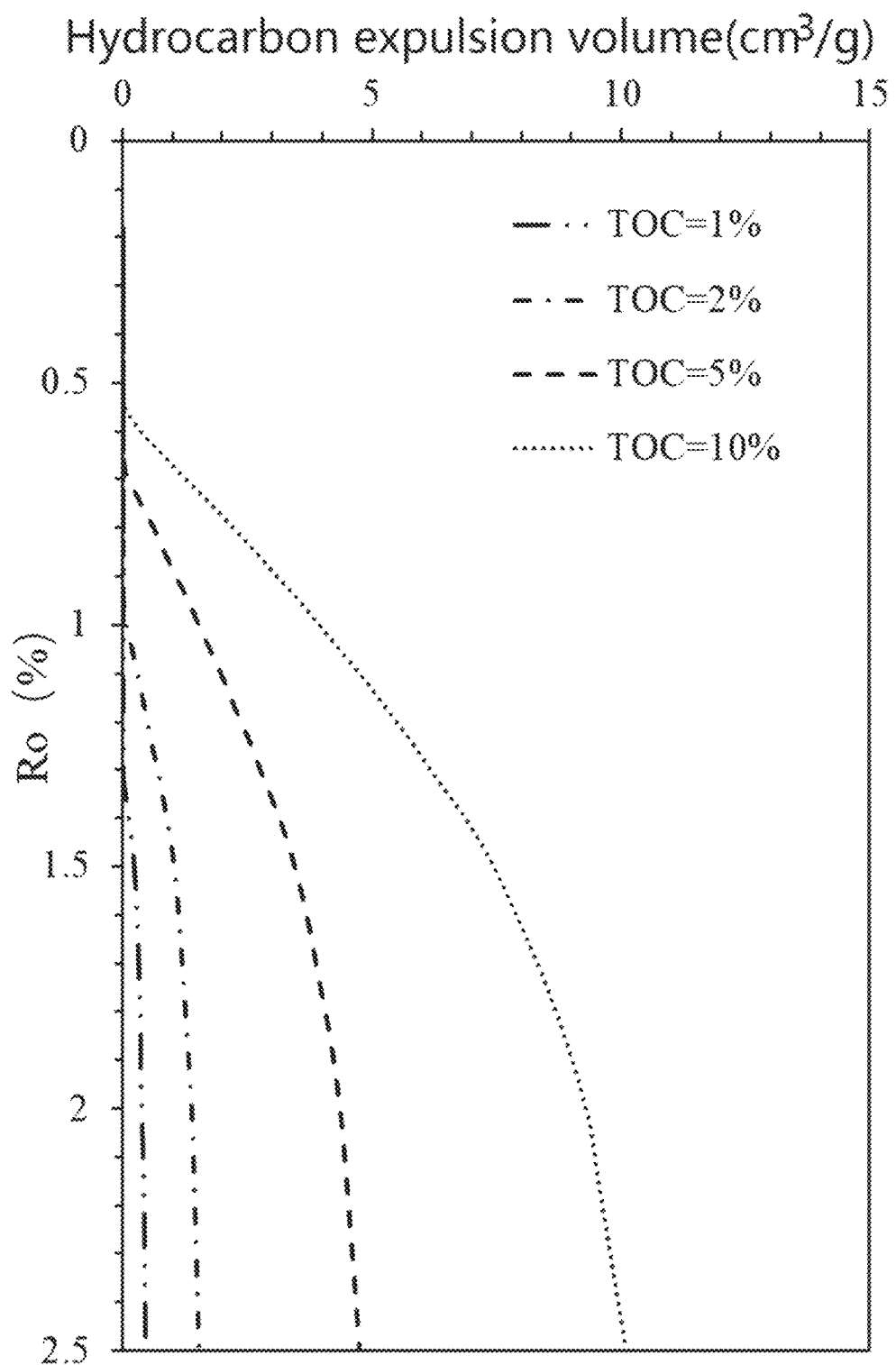
FIG. 11 is a schematic diagram of a change curve of hydrocarbon expulsion volume with maturity provided by an embodiment of the present invention.

The change curve of hydrocarbon expulsion volume of the source rock is established, and the equation is as follows:

$$V_{hydrocarbon\ expulsion}=V_{gas\ generation}-V_{retained}=V_{gas\ generation}-(V_{adsorption}+V_{free})$$

where the retained gas volume is the sum of the free gas and adsorbed gas volumes, according to the evaluation model of free gas and adsorbed gas, combined with the burial and thermal history of Xujiahe Formation in Sichuan Basin, the relationship between burial depth, temperature and maturity is established, and the evaluation of the retained gas volume of source rock under different maturities ($V_{adsorption}+V_{free}$) is realized;

where the hydrocarbon generation yield $A_{hydrocarbon\ generation\ i}$ under a certain maturity Roi is obtained by using the obtained hydrocarbon generation yield curve, the gas generation volume $V_{gas\ generation}$ i of the source rock under a certain maturity is calculated by combining the original TOCo of the source rock, the gas generation change curve is obtained by calculating the hydrocarbon generation volume under different maturities; FIG. 9 is a schematic diagram of change curve of hydrocarbon generation with maturity provided by an embodiment of the present invention;

$$V_{gas\ generation}=A_{hydrocarbon\ generation}\times\frac{TOCo}{100}/\rho_{methane} \qquad (50)$$

where, $\rho_{methane}$ is a methane density under a standard condition, 0.000717 g/cm$^3$;

the hydrocarbon expulsion curve of the source rock is calculated according to the change of gas generation and retained gas in the source rock under different maturities; FIG. 11 is a schematic diagram of the change curve of hydrocarbon expulsion volume with maturity provided by an embodiment of the present invention; when the gas generation volume is less than or equal to the maximum retained gas volume at a certain maturity, there is no methane gas discharged from the source rock, and the hydrocarbon expulsion volume is 0; when the volume of gas generated is greater than the maximum retained gas volume of the source rock, gas expulsion begins, and the hydrocarbon expulsion volume is greater than 0. FIG. 10 is a schematic diagram of the change curve of retained gas volume with maturity provided by an embodiment of the present invention.

(3) The classification boundary of source rocks is determined based on the evolution of hydrocarbon generation and hydrocarbon expulsion.

Figure 12:
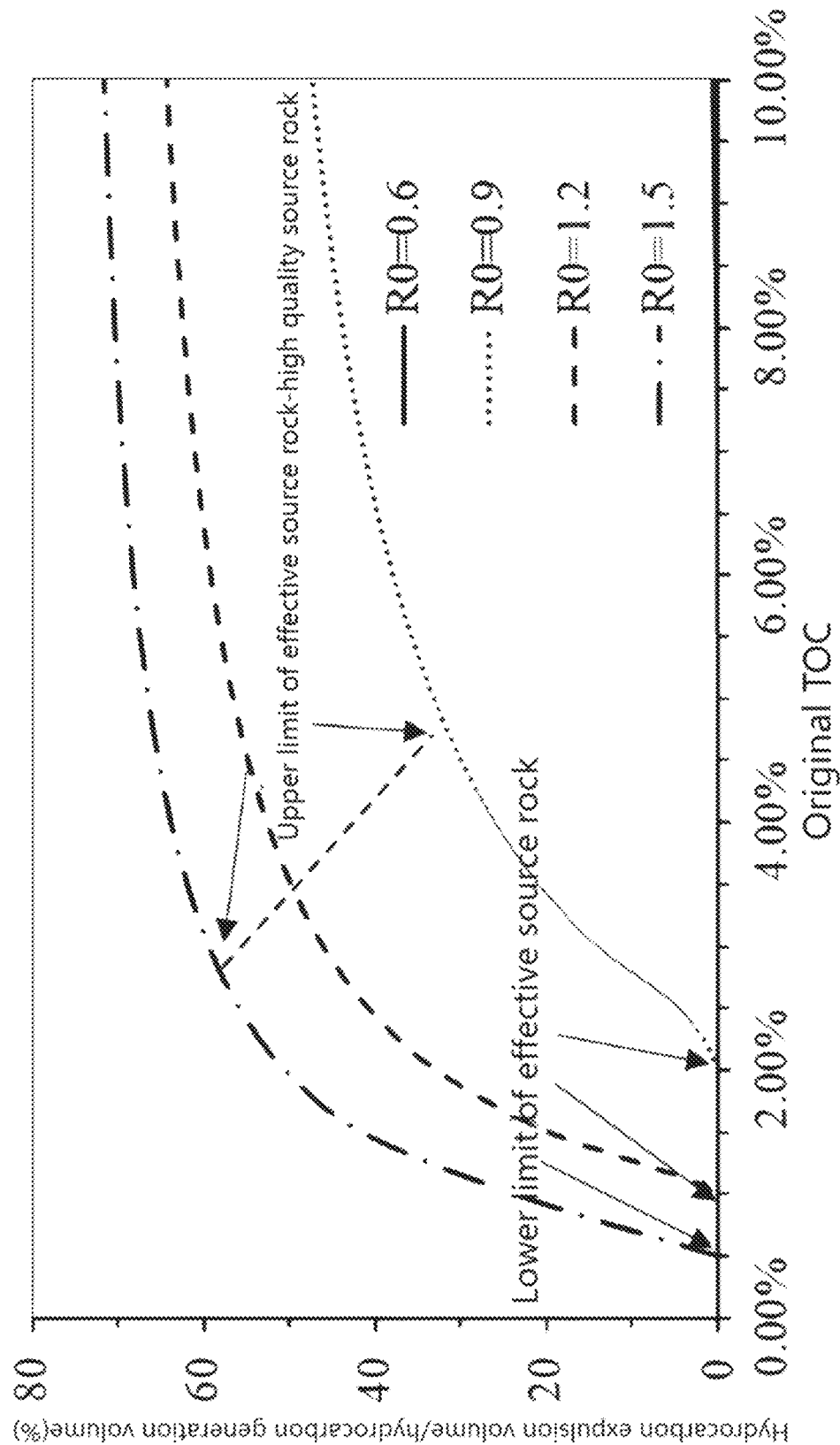
FIG. 12 is a schematic diagram showing the relationship between original TOC and hydrocarbon expulsion efficiency to establish a boundary between effective source rock and high-quality source rock provided by an embodiment of the present invention.
Figure 13:
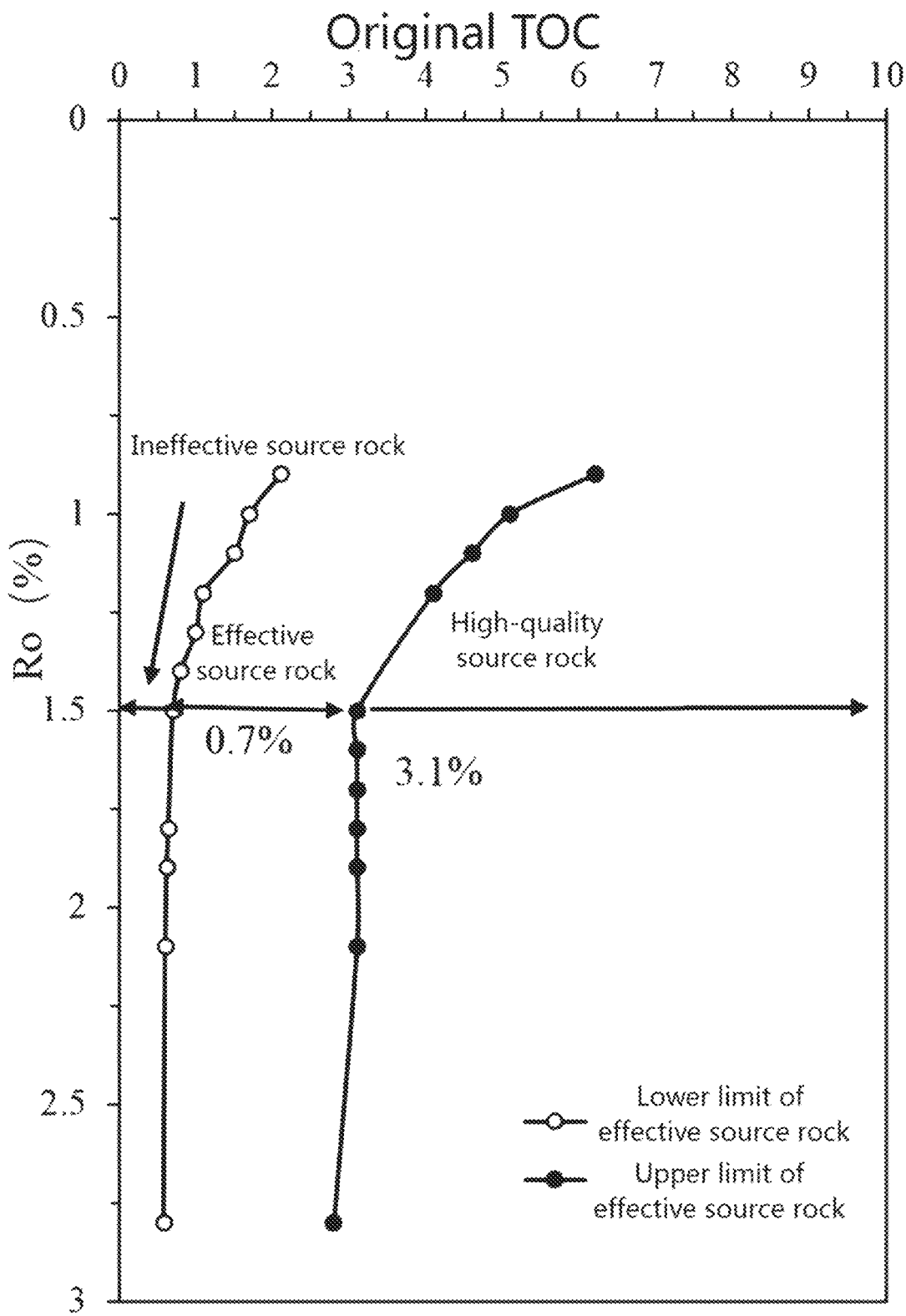
FIG. 13 is a schematic diagram of a boundary between effective source rock and high-quality source rock under different maturities in the fifth member of Xujiahe Formation in Sichuan Basin provided by the embodiment of the present invention.

The maturity of the source rocks of the Xujiahe Formation in the Sichuan Basin is widely distributed (0.7%-2.5%), and the relationship between maturity and depth varies greatly in different tectonic belts. Organic carbon abundance is higher, roughly distributed in 1%-4%. A series of maturity values (4) is preferably selected as Roj-0.6%, 0.9%, 1.2%, 1.5%, and the TOC value (11) is obtained with 0.5 as the step size, for any TOCi, after the original TOC is restored according to Equation (1), the hydrocarbon generation evolution and hydrocarbon expulsion evolution curves are established according to Equation (9) and Equation (8), respectively, the $V_{gas\ generation\ ij}$ (when corresponding to TOCj and Roi) and $V_{hydrocarbon\ expulsion\ ij}$ (when corresponding to TOCj and Roi) corresponding to Roj, are extracted and the hydrocarbon expulsion efficiency $K_{ij}=V_{hydrocarbon\ expulsion\ ij}/V_{gas\ generation\ ij}$ is calculated, a change curve of hydrocarbon expulsion efficiency with TOC$_i$ under a certain maturity Roj is established. According to the hydrocarbon expulsion efficiency curve, it can be obtained that when the maturity Roj-1.2%, the hydrocarbon expulsion efficiency begins to be greater than 0, and the corresponding original TOC=1.1%, which is the lower limit of the effective source rock under the maturity; when the original TOC=4.1%, the change rate of hydrocarbon expulsion efficiency of two adjacent points begins to be less than 10%, and the corresponding original TOC value is the lower limit of high-quality source rock at this maturity (FIG. 12). By changing Roj, the classification boundary of effective source rocks and high-quality source rocks in different maturity ranges are obtained (FIG. 13).

(4) According to the classification boundary of source rock, the spatial distribution of different types of source rocks is obtained combined with logging interpretation. Based on the improved ΔlgR method, the regression analysis of acoustic, resistivity and natural gamma curve is carried out to establish the abundance model of organic matter in different areas of Sichuan Basin. The central Sichuan Basin is taken as an example, according to the relationship between burial depth and maturity, the relationship model between burial depth and maturity in different areas is established, the northwestern Sichuan Basin is taken as an example: H=3190.7 ln (Ro)+2695.7, H is burial depth, m. Combined with the classification boundary of source rocks under different maturities, the vertical distribution of high-quality source rocks and effective source rocks is identified, and their thickness is counted, through logging interpretation of multiple wells, the spatial characterization of different types of source rocks in the fifth member of Xujiahe Formation in Sichuan Basin is carried out, and the thickness of effective source rocks and the spatial distribution map of high-quality source rocks are obtained.

Embodiment 4

A computer device, the computer device includes memory and a processor, the memory stores a computer program, and the processor executes the computer program to implement steps of the grading evaluation method for high-maturity gas source rock based on hydrocarbon generation and expulsion simulation according to any one of embodiments 1-3.

Embodiment 5

A computer-readable storage medium, a computer program is stored on the computer-readable storage medium, steps of the grading evaluation method for high-maturity gas source rock based on hydrocarbon generation and expulsion simulation according to any one of embodiments 1-3 are implemented when the computer program is executed by the processor.

Embodiment 6

A grading evaluation system for high-maturity gas source rock based on hydrocarbon generation and expulsion simulation, including:
- an establishment module of change curve of hydrocarbon generation yield is configured as: a change curve of hydrocarbon generation yield is established based on a hydrocarbon generation thermal simulation experiment;
- an establishment module of change curve of hydrocarbon expulsion of source rocks is configured as: a change curve of hydrocarbon expulsion of source rocks is established based on a principle of material balance;
- a determination module of classification boundary of the source rock is configured as: a classification boundary of source rocks is determined based on the change curve of hydrocarbon generation yield and the change curve of hydrocarbon expulsion of source rocks;
- a determination module of a spatial distribution type of source rock is configured as: a spatial distribution of different types of source rocks is obtained by combining logging interpretation according to the classification boundary of source rocks.

What is claimed is:

1. A grading evaluation method for high-maturity gas source rock based on hydrocarbon generation and expulsion simulation, comprising following steps:
   establishing a change curve of a hydrocarbon generation yield to determine a classification boundary of source rocks based on a hydrocarbon generation thermal simulation experiment, comprising following steps:
   sorting out geochemical test data of a source rock of a target layer in a study area, and analyzing geochemical index characteristics of the source rock Total Organic Carbon (TOC), a maturity, an organic matter type, a residual hydrocarbon S1, a cracked hydrocarbon S2, an amount of $CO_2$ produced by organic matter pyrolysis S3, a pyrolysis hydrocarbon peak temperature Tmax, and a hydrogen index HI; selecting source rock samples in the target layer, and carrying out the hydrocarbon generation thermal simulation experiment to obtain a hydrocarbon generation volume at different evolution stages, obtaining information of the residual TOC, S1, S2 and hydrogen index HI of experimental samples at different maturities by testing;
   restoring an original TOC and an original HI of the experimental samples by using a theory of material balance;
   based on experimentally obtained hydrogen index HI at different maturities and a restoration of original HI, using an optimized fitting equation to fit the hydrogen index HI at a low-maturity stage, and obtaining a distribution curve of the hydrogen index HI in a whole maturity range;
   using an original hydrogen index HIo minus the hydrogen index HI at different maturities, calculating and obtaining the hydrocarbon generation yield of the source rock; and
   obtaining characteristics of hydrocarbon generation components by combining the hydrocarbon generation simulation experiment, obtaining a relative proportion change of the hydrocarbon generation components at the low-maturity stage by fitting a change trend of the relative proportion of different components, obtaining a change curve of the hydrocarbon generation yield at the low-maturity stage, and obtaining a change curve of the hydrocarbon generation yield in different maturity stages;
   establishing a change curve of hydrocarbon expulsion of source rocks to determine the classification boundary of source rocks based on a principle of material balance, comprising following steps:
   carrying out an isothermal adsorption experiment of methane in the source rock samples, and establishing an evaluation model of methane adsorption gas in the source rocks by combining TOC, strata pressure and temperature;
   establishing an evaluation model of free gas by using a gas state equation through combining collected data of a source rock porosity, a water saturation, a strata temperature, a pressure, a gas compression factor and a rock sample density, and then obtaining an evaluation model of source rock retained gas; and
   establishing a relationship between the maturity and a burial depth, the strata temperature and pressure according to a burial history and a thermal history to obtain a maximum retained gas volume distribution curve of the source rock under different maturities; according to a generation-retained-expulsion method, and according to a relationship between hydrocarbon generation volume curve and the maximum retained gas curve under different maturities, calculating a change curve of a hydrocarbon expulsion volume under different maturities;
   determining the classification boundary of the source rocks to obtain a spatial distribution of different types of the source rocks based on the change curve of the hydrocarbon generation yield and the change curve of hydrocarbon expulsion of the source rocks, comprising following steps:
   establishing a change curve of hydrocarbon expulsion efficiency with TOCi of any source rock under a certain maturity Roj, that is, a hydrocarbon expulsion efficiency curve; and
   when the hydrocarbon expulsion efficiency curve begins to be greater than 0, a corresponding TOCi value is a lower limit of an effective source rock at this maturity; when the change rate of hydrocarbon expulsion efficiency at two adjacent points begins to be less than 10%, a corresponding TOC value is a lower limit of a high-quality source rock at this maturity; it is considered that under this maturity, the effective source rock is evaluated when the original TOC value is greater than the lower limit of the effective source rock, and less than the lower limit of the high-quality source rock; the high-quality source rock is evaluated when the original TOC value is greater than the lower limit of the high-quality source rock; obtaining the change curve of hydrocarbon expulsion efficiency with TOCi under different maturities by changing Roj; obtaining a classification boundary of the effective source rock and the high-quality source rock under different maturities according to a source rock boundary division method;

obtaining the spatial distribution of different types of the source rocks by combining logging interpretation according to the classification boundary of the source rocks, comprising following steps:

based on an improved ΔlgR method, combining with acoustic and resistivity curves, carrying out a regression analysis according to in a TOC interpretation model, and establishing a prediction model of source rock organic matter abundance;

obtaining a maturity under different burial depths by combining the burial history and the thermal history of a study area, and obtaining a relationship between the maturity and the burial depth by fitting the maturity and the burial depth; and obtaining an organic carbon content under different burial depths by using a source rock organic matter abundance model established by acoustic and resistivity curve; obtaining the maturity under different burial depths according to the relationship between the maturity and the burial depth; identifying a vertical distribution of effective source rocks and high-quality source rocks in a plurality of wells by combining the classification boundary of the source rocks under different maturities; and realizing a spatial distribution characterization of different types of source rock thickness in the study area by counting thickness of different types of source rocks in the plurality of wells and combining well coordinates;

restoring the original TOC and the original HI of the experimental samples to classify the source rocks by using the theory of material balance, comprising following steps:

restoring an original organic carbon content $TOC_o$ and an original hydrogen index HIo, as shown in Equation (1):

$$TOC_o \times (1-D_o) = TOC_i \times (1-D_i) \qquad (1)$$

in Equation (1), $TOC_o$ and $TOC_i$ denote the original organic carbon content of the sample and a current organic carbon content of the sample respectively; $D_o$ and $D_i$ denote an original degradation rate and a residual degradation rate respectively, and $D_o$ and $D_i$ represent a ratio of effective carbon Cp and organic carbon Ct of the source rock; the original degradation rate $D_o$ is related to an organic matter type of the source rock, according to Tmax and HI data obtained from an investigation of the study area, a source rock type is identified, and the original degradation rate of the sample is selected; the effective carbon Cp is obtained by using a conversion coefficient of carbon conversion to hydrocarbon volume, and then $D_i$ is obtained, as shown in Equation (2):

$$Di = Cp/Ct = ((S1+S2) \times 0.083)/TOCi \qquad (2)$$

wherein S1 is residual hydrocarbon; S2 is cracked hydrocarbon;

a calculation formula of an original hydrocarbon generation potential S2o of the sample is shown in Equation (3):

$$S2o = (TOCo \times Do)/0.083 \qquad (3)$$

the restoration of the original hydrogen index HIo is shown in Equation (4) as follows:

$$HIo = S2o/TOCo \qquad (4).$$

2. The grading evaluation method to claim 1, wherein the source rock samples are selected to carry out the hydrocarbon generation thermal simulation experiment to establish the change curve of the hydrocarbon generation yield under different maturities.

3. The grading evaluation method according to claim 1, wherein based on the experimentally obtained hydrogen index HI at different maturities and the restoration of the original hydrogen index HIo, the optimized fitting equation is used to fit the hydrogen index HI at the low-maturity stage, and the distribution curve of the hydrogen index HI in the whole maturity range is obtained, comprising following steps:

establishing an evolution curve of the hydrogen index, based on the original hydrogen index HIo, and HI data of the source rocks at different maturity stages in hydrocarbon generation thermal simulation experiments, determining an evolution curve of the hydrogen index at the low-maturity stage (Ro<1.5) by an optimized fitting method, and a fitting equation is shown in Equation (5):

$$HI(R_0) = \frac{HIo}{1 + \exp\left(\theta * \ln\left(\frac{Ro}{\beta}\right)\right)} \qquad (5)$$

in Equation (5), HIo is the original hydrogen index, θ and β are dimensionless parameters, and θ and β represent a range of hydrocarbon generation and a peak of hydrocarbon generation; using the original hydrogen index HIo minus the hydrogen index HI at different maturities, the hydrocarbon generation yield of the source rock is calculated; according to the hydrocarbon generation thermal simulation experiment, a hydrocarbon generation yield of the source rock sample after the current maturity is obtained to splice the hydrocarbon generation yield of the source rock to obtain the distribution curve of the hydrocarbon generation yield in a whole maturity range.

4. The grading evaluation method according to claim 1, wherein a Langmuir equation is used to establish an evaluation model of adsorption gas, comprising: an establishment of the evaluation model of methane adsorption gas in the source rock, comprising following steps:

selecting several source rock samples with different TOC to carry out a methane isothermal adsorption experiment to obtain a Langmuir volume $V_L$ and a Langmuir pressure $P_L$, analyzing a relationship between $V_L$ and $P_L$ with TOC, temperature and clay minerals, and establishing calculation models of $V_L$ and $P_L$ by selecting indexes; according to the current TOC and strata pressure, temperature, clay mineral parameters, obtaining an adsorption gas volume $V_{adsorption}$ of the source rock by using the Langmuir equation as shown in Equation (6):

$$V_{adsorption} = (V_L P)/(P+P_L) = h_1(P,T,TOC,clay) \qquad (6)$$

in Equation (6), T is a strata temperature, K; $V_L$ is the Langmuir volume, and $V_L$ represents a maximum methane adsorption capacity; $P_L$ is the Langmuir pressure, MPa; P is a strata pressure, MPa; $V_{adsorption}$ is an adsorption gas volume; clay is a clay content;

an established evaluation model of methane adsorption gas in the source rock, that is, a calculation model of $V_L$ and $P_L$, is shown in Equation (6) above;

an establishment of the evaluation model of free gas by using the gas state equation, comprising:

obtaining a content of free gas $V_{free}$ by using an ideal gas state equation as shown in Equation (7):

$$V_{free} = h_2(P, T, \varphi, Sw, Z) = \frac{P\varphi(1-Sw)ZoTo}{PoZT\rho} \qquad (7)$$

in Equation (7), φ is a porosity of the source rock, decimal, derived by collecting porosity test values of the source rock under different maturities, and establishing a relationship between porosity and maturity evolution by fitting; P is the strata pressure, MPa; Po is pressure under a standard condition, MPa; T is the strata temperature, K; To is a surface temperature, K; Sw is a water saturation, decimal, derived by collecting measured water saturation data of the source rock samples, and establishing a relationship of water saturation with maturity and clay content; Z and Zo are methane compression factors under strata conditions and standard atmospheric pressure, obtained by industry standard query; ρ is a density of rock sample;

the established evaluation model of free gas is shown in Equation (7) above;

under the same maturity, the adsorbed gas volume plus the free gas volume to obtain the retained gas volume, that is, $V_{retained} = V_{adsorption} + V_{free}$, so as to calculate and obtain the evaluation model of retained gas in the source rock under different maturities.

5. The grading evaluation method according to claim 4, wherein the change curve of the hydrocarbon expulsion volume is calculated under different maturities, comprising following steps:

a combining with the change curve of the hydrocarbon generation yield, establishing the relationship between the maturity and the burial depth, the strata temperature and the pressure according to the burial history and the thermal history to obtain the maximum retained gas volume distribution curve of the source rock under different maturities; using the generation-retained-expulsion method, according to the relationship between the gas generation curve and the maximum retained gas curve under different maturities, calculating the change curve of the hydrocarbon expulsion volume under different maturities as shown in Equation (8):

$$V_{hydrocarbon\ expulsion} = V_{gas\ generation} - V_{retained} = V_{gas\ generation} - (V_{adsorption} + V_{free}) \qquad (8)$$

in Equation (8), $V_{gas\ generation}$ is a gas generation volume; $V_{hydrocarbon\ expulsion}$ is the hydrocarbon expulsion volume under a certain maturity of the source rock; a retained gas volume is a sum of free gas and adsorbed gas according to the evaluation model of adsorbed gas and the evaluation model of free gas, and combined with the burial history and the thermal history of the study area, the relationship of the burial depth with the temperature, the maturity and the strata pressure is established by an equation fitting to obtain the maximum retained gas volume distribution curve in the source rock under different maturities; using the generation-retained-expulsion method, according to the relationship between the gas generation curve and the maximum retained gas curve under different maturities, realizing an evaluation of hydrocarbon expulsion of the source rocks under different maturities;

obtaining a hydrocarbon generation yield $A_{hydrocarbon\ generation\ i}$ under a certain maturity Roi by using the obtained hydrocarbon generation yield curve, combining with the original TOCo of the source rock, calculating the gas generation volume $V_{gas\ generation\ i}$ of the source rock under a certain maturity, and obtaining a gas generation curve by calculating the gas generation volume under different maturities as shown in Equation (9):

$$V_{gas\ generation} = A_{hydrocarbon\ generation} \times \frac{TOCo}{100} / \rho_{methane} \qquad (9)$$

wherein $\rho_{methane}$ is a methane density under a standard condition, 0.000717 g/cm³;

calculating the change curve of hydrocarbon expulsion of the source rock according to the change of gas generation volume and gas retained volume in the source rock under different maturities; it means that under a certain maturity, when the gas generation volume is less than or equal to the maximum retained gas volume, there is no methane gas released from the source rock, and the hydrocarbon expulsion volume is 0; when the volume of gas generated is greater than the maximum retained gas volume of the source rock, gas expulsion begins, and the hydrocarbon expulsion volume is greater than 0.

6. The grading evaluation method according to claim 1, wherein the classification boundary of the source rocks is determined based on the change curve of the hydrocarbon generation yield and a change curve of hydrocarbon expulsion of the source rocks, comprising following steps:

analyzing a distribution range of source rock maturity and TOC in the study area, and preferably selecting a series of maturity values and corresponding TOC values according to a certain step size, for any TOCi, restoring an original TOC according to Equation (1), establishing the change curves of gas generation and hydrocarbon expulsion volume respectively according to Equation (9) and Equation (8), extracting the gas generation $V_{gas\ generation\ ij}$ and hydrocarbon expulsion $V_{hydrocarbon\ expulsion\ ij}$ corresponding to Roj, and calculating the hydrocarbon expulsion efficiency $K_{ij} = V_{hydrocarbon\ expulsion\ ij} / V_{gas\ generation\ ij}$, establishing a change curve of hydrocarbon expulsion efficiency with $TOC_i$ under a certain maturity Roj, that is, a hydrocarbon expulsion efficiency curve.

7. A grading evaluation system for high-maturity gas source rock based on hydrocarbon generation and expulsion simulation, used for realizing the grading evaluation method according to claim 1, and comprising:

establish the change curve of the hydrocarbon generation yield based on the hydrocarbon generation thermal simulation experiment;

establish the change curve of the hydrocarbon expulsion of the source rocks based on the principle of material balance;

determine the classification boundary of the source rocks based on the change curve of the hydrocarbon generation yield and the change curve of the hydrocarbon expulsion of the source rocks; and obtain the spatial distribution of different types of the source rocks by combining logging interpretation according to the classification boundary of the source rocks;

restoring the original TOC and the original HI of the experimental samples by using the theory of material balance, comprising:

restoring the original organic carbon content $TOC_o$ and the original hydrogen index HIo, as shown in Equation (1):

$$TOC_o \times (1-D_o) = TOC_i \times (1-D_i) \quad (1)$$

in Equation (1), $TOC_o$ and TOCi denote the original organic carbon content of the sample and the current organic carbon content of the sample respectively; $D_o$ and $D_i$ denote the original degradation rate and the residual degradation rate respectively, and $D_o$ and $D_i$ represent the ratio of effective carbon Cp and organic carbon Ct of the source rock; the original degradation rate $D_o$ is related to an organic matter type of the source rock, according to the Tmax and HI data obtained from the investigation of the study area, the source rock type is identified, and the original degradation rate of the sample is selected; the effective carbon Cp is obtained by using the conversion coefficient of carbon conversion to hydrocarbon volume, and then $D_i$ is obtained, as shown in Equation (2):

$$Di = Cp/Ct = ((S1+S2) \times 0.083)/TOCi \quad (2)$$

wherein S1 is the residual hydrocarbon; S2 is the cracked hydrocarbon;

the calculation formula of the original hydrocarbon generation potential S2o of the sample is shown in Equation (3):

$$S2o = (TOCo \times Do)/0.083 \quad (3)$$

the restoration of the original hydrogen index HIo is shown in Equation (4) as follows:

$$HIo = S2o/TOCo \quad (4).$$

8. The grading evaluation system according to claim 7, wherein in the grading evaluation method, the source rock samples are selected to carry out the hydrocarbon generation thermal simulation experiment to establish the change curve of the hydrocarbon generation yield under different maturities.

9. The grading evaluation system according to claim 7, wherein in the grading evaluation method, based on the experimentally obtained hydrogen index HI at different maturities and the restoration of the original hydrogen index HIo, the optimized fitting equation is used to fit the hydrogen index HI at the low-maturity stage, and the distribution curve of the hydrogen index HI in the whole maturity range is obtained, comprising:

establishing an evolution curve of the hydrogen index, based on the original hydrogen index HIo, and HI data of the source rocks at different maturity stages in hydrocarbon generation thermal simulation experiments, determining an evolution curve of the hydrogen index at the low-maturity stage (Ro<1.5) by an optimized fitting method, and a fitting equation is shown in Equation (5):

$$HI(R_0) = \frac{HIo}{1 + \exp\left(\theta * \ln\left(\frac{Ro}{\beta}\right)\right)} \quad (5)$$

in Equation (5), HIo is the original hydrogen index, $\theta$ and $\beta$ are dimensionless parameters, and $\theta$ and $\beta$ represent a range of hydrocarbon generation and a peak of hydrocarbon generation; using the original HIo minus the hydrogen index HI at different maturities, the hydrocarbon generation yield of the source rock is calculated; according to the hydrocarbon generation thermal simulation experiment, a hydrocarbon generation yield of the source rock sample after the current maturity is obtained to splice the hydrocarbon generation yield of the source rock to obtain the distribution curve of the hydrocarbon generation yield in a whole maturity range.

10. The grading evaluation system according to claim 7, wherein in the grading evaluation method, a Langmuir equation is used to establish an evaluation model of adsorption gas, comprising: an establishment of the evaluation model of methane adsorption gas in the source rock, comprising:

selecting several source rock samples with different TOC to carry out a methane isothermal adsorption experiment to obtain a Langmuir volume $V_L$ and a Langmuir pressure $P_L$, analyzing a relationship between $V_L$ and $P_L$ with TOC, temperature and clay minerals, and establishing calculation models of $V_L$ and $P_L$ by selecting indexes; according to the current TOC and strata pressure, temperature, clay mineral parameters, obtaining an adsorption gas volume $V_{adsorption}$ of the source rock by using the Langmuir equation as shown in Equation (6):

$$V_{adsorption} = (V_L P)/(P+P_L) = h_1(P,T,TOC,clay) \quad (6)$$

in Equation (6), T is a strata temperature, K; $V_L$ is the Langmuir volume, and $V_L$ represents a maximum methane adsorption capacity; $P_L$ is the Langmuir pressure, MPa; P is a strata pressure, MPa; $V_{adsorption}$ is an adsorption gas volume; clay is a clay content;

an established evaluation model of methane adsorption gas in the source rock, that is, a calculation model of $V_L$ and $P_L$, is shown in Equation (6) above;

an establishment of the evaluation model of free gas by using the gas state equation, comprising following steps:

obtaining a content of free gas $V_{free}$ by using an ideal gas state equation as shown in Equation (7):

$$V_{free} = h_2(P, T, \varphi, Sw, Z) = \frac{P\varphi(1-Sw)ZoTo}{PoZT\rho} \quad (7)$$

in Equation (7), $\varphi$ is a porosity of the source rock, decimal, derived by collecting porosity test values of the source rock under different maturities, and establishing a relationship between porosity and maturity evolution by fitting; P is the strata pressure, MPa; Po is pressure under a standard condition, MPa; T is the strata temperature, K; To is a surface temperature, K; Sw is a water saturation, decimal, derived by collecting measured water saturation data of the source rock samples, and establishing a relationship between water saturation and maturity and clay content; Z and Zo are methane compression factors under strata conditions and standard atmospheric pressure, obtained by industry standard query; $\rho$ is a density of rock sample;

the established evaluation model of free gas is shown in Equation (7) above;

under the same maturity, the adsorbed gas volume plus the free gas volume to obtain the retained gas volume, that is, $V_{retained}=V_{adsorption}+V_{free}$, so as to calculate and obtain the evaluation model of retained gas in the source rock under different maturities.

11. The grading evaluation system according to claim 10, wherein in the grading evaluation method, the change curve of the hydrocarbon expulsion volume is calculated under different maturities, comprising:

combining with the change curve of the hydrocarbon generation yield, establishing the relationship between the maturity and the burial depth, the strata temperature and the pressure according to the burial history and the thermal history to obtain the maximum retained gas volume distribution curve of the source rock under different maturities; using the generation-retained-expulsion method, according to the relationship between the gas generation curve and the maximum retained gas curve under different maturities, calculating the change curve of the hydrocarbon expulsion volume under different maturities as shown in Equation (8):

$$V_{hydrocarbon\ expulsion} = V_{gas\ generation} - V_{retained} = V_{gas\ generation} - (V_{adsorption}+V_{free}) \quad (8)$$

in Equation (8), $V_{gas\ generation}$ is a gas generation volume; $V_{hydrocarbon\ expulsion}$ is the hydrocarbon expulsion volume under a certain maturity of the source rock; a retained gas volume is a sum of free gas and adsorbed gas according to the evaluation model of adsorbed gas and the evaluation model of free gas, and combined with the burial history and the thermal history of the study area, the relationship of the burial depth with the temperature, the maturity and the strata pressure is established by an equation fitting to obtain the maximum retained gas volume distribution curve in the source rock under different maturities; using the generation-retained-expulsion method, according to the relationship between the gas generation curve and the maximum retained gas curve under different maturities, realizing an evaluation of hydrocarbon expulsion of the source rocks under different maturities;

obtaining a hydrocarbon generation yield $A_{hydrocarbon\ generation\ i}$ under a certain maturity Roi by using the obtained hydrocarbon generation yield curve, combining with the original TOCo of the source rock, calculating the gas generation volume $V_{gas\ generation\ i}$ of the source rock under a certain maturity, and obtaining a gas generation curve by calculating the gas generation volume under different maturities as shown in Equation (9):

$$V_{gas\ generation} = A_{hydrocarbon\ generation} \times \frac{TOCo}{100}/\rho_{methane} \quad (9)$$

wherein $\rho_{methane}$ is a methane density under a standard condition, 0.000717 g/cm³;

calculating the change curve of hydrocarbon expulsion of the source rock according to the change of gas generation volume and gas retained volume in the source rock under different maturities; it means that under a certain maturity, when the gas generation volume is less than or equal to the maximum retained gas volume, there is no methane gas released from the source rock, and the hydrocarbon expulsion volume is 0; when the volume of gas generated is greater than the maximum retained gas volume of the source rock, gas expulsion begins, and the hydrocarbon expulsion volume is greater than 0.

12. The grading evaluation system according to claim 7, wherein in the grading evaluation method, the classification boundary of the source rocks is determined based on the change curve of the hydrocarbon generation yield and a change curve of hydrocarbon expulsion of the source rocks, comprising:

analyzing a distribution range of source rock maturity and TOC in the study area, and preferably selecting a series of maturity values and corresponding TOC values according to a certain step size, for any TOCi, restoring an original TOC according to Equation (1), establishing the change curves of gas generation and hydrocarbon expulsion volume respectively according to Equation (9) and Equation (8), extracting the gas generation $V_{gas\ generation\ ij}$ and hydrocarbon expulsion $V_{hydrocarbon\ expulsion\ ij}$ corresponding to Roj, and calculating the hydrocarbon expulsion efficiency $K_{ij}=V_{hydrocarbon\ expulsion\ ij}/V_{gas\ generation\ ij}$, establishing a change curve of hydrocarbon expulsion efficiency with TOCi under a certain maturity Roj, that is, a hydrocarbon expulsion efficiency curve.

* * * * *